US011687382B2

(12) United States Patent
Walters et al.

(10) Patent No.: US 11,687,382 B2
(45) Date of Patent: *Jun. 27, 2023

(54) SYSTEMS AND METHODS FOR MOTION CORRECTION IN SYNTHETIC IMAGES

(71) Applicant: CAPITAL ONE SERVICES, LLC, McLean, VA (US)

(72) Inventors: Austin Walters, Savoy, IL (US); Jeremy Goodsitt, Champaign, IL (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 142 days.

This patent is subject to a terminal disclaimer.

(21) Appl. No.: 17/139,203

(22) Filed: Dec. 31, 2020

(65) Prior Publication Data

US 2021/0200604 A1 Jul. 1, 2021

Related U.S. Application Data

(63) Continuation of application No. 16/658,858, filed on Oct. 21, 2019, now Pat. No. 10,896,072, which is a
(Continued)

(51) Int. Cl.
*G06K 9/00* (2022.01)
*G06F 9/54* (2006.01)
(Continued)

(52) U.S. Cl.
CPC .............. *G06F 9/541* (2013.01); *G06F 8/71* (2013.01); *G06F 9/54* (2013.01); *G06F 9/547* (2013.01);
(Continued)

(58) Field of Classification Search
None
See application file for complete search history.

(56) References Cited

U.S. PATENT DOCUMENTS 6,137,912 A 10/2000 Kostrzewski et al.
9,716,842 B1 7/2017 Worley
(Continued)

OTHER PUBLICATIONS

Vondrick, Carl, Hamed Pirsiavash, and Antonio Torralba. "Generating videos with scene dynamics." Advances In Neural Information Processing Systems. 2016 (Year: 2016).
(Continued)

*Primary Examiner* — Soo Jin Park
(74) *Attorney, Agent, or Firm* — Finnegan, Henderson, Farabow, Garrett & Dunner, L.L.P.

(57) ABSTRACT

Systems and methods for generating synthetic video are disclosed. For example, the system may include one or more memory units storing instructions and one or more processors configured to execute the instructions to perform operations. The operations may include generating a static background image and determining the location of a reference edge. The operations may include determining a perspective of an observation point. The operations may include generating synthetic difference images that include respective synthetic object movement edges. The operations may include determining a location of the respective synthetic object movement edge and generating adjusted difference images corresponding to the individual synthetic difference images. Adjusted difference images may be based on synthetic difference images, locations of the respective synthetic object movement edges, the perspective of the observation point, and the location of the reference edge. The operations may include generating texturized images based on the adjusted difference images.

20 Claims, 8 Drawing Sheets

Related U.S. Application Data continuation of application No. 16/263,839, filed on Jan. 31, 2019, now Pat. No. 10,482,607.

(60) Provisional application No. 62/694,968, filed on Jul. 6, 2018.

(51) Int. Cl.

| | |
|---|---|
| G06N 20/00 | (2019.01) |
| G06F 17/16 | (2006.01) |
| G06N 3/04 | (2023.01) |
| G06F 11/36 | (2006.01) |
| G06N 3/088 | (2023.01) |
| G06F 21/62 | (2013.01) |
| G06N 5/04 | (2023.01) |
| G06F 17/15 | (2006.01) |
| G06T 7/194 | (2017.01) |
| G06T 7/254 | (2017.01) |
| G06T 7/246 | (2017.01) |
| G06F 16/2455 | (2019.01) |
| G06F 16/22 | (2019.01) |
| G06F 16/28 | (2019.01) |
| G06F 16/906 | (2019.01) |
| G06F 16/93 | (2019.01) |
| G06F 16/903 | (2019.01) |
| G06F 16/9038 | (2019.01) |
| G06F 16/9032 | (2019.01) |
| G06F 16/25 | (2019.01) |
| G06F 16/335 | (2019.01) |
| G06F 16/242 | (2019.01) |
| G06F 16/248 | (2019.01) |
| G06F 30/20 | (2020.01) |
| G06F 40/166 | (2020.01) |
| G06F 40/117 | (2020.01) |
| G06F 40/20 | (2020.01) |
| G06F 8/71 | (2018.01) |
| G06F 17/18 | (2006.01) |
| G06F 21/55 | (2013.01) |
| G06F 21/60 | (2013.01) |
| G06N 7/00 | (2023.01) |
| G06Q 10/04 | (2023.01) |
| G06T 11/00 | (2006.01) |
| H04L 9/40 | (2022.01) |
| H04L 67/306 | (2022.01) |
| H04L 67/00 | (2022.01) |
| H04N 21/234 | (2011.01) |
| H04N 21/81 | (2011.01) |
| G06N 5/00 | (2023.01) |
| G06N 5/02 | (2023.01) |
| G06V 30/196 | (2022.01) |
| G06F 18/22 | (2023.01) |
| G06F 18/23 | (2023.01) |
| G06F 18/24 | (2023.01) |
| G06F 18/40 | (2023.01) |
| G06F 18/213 | (2023.01) |
| G06F 18/214 | (2023.01) |
| G06F 18/21 | (2023.01) |
| G06F 18/20 | (2023.01) |
| G06F 18/2115 | (2023.01) |
| G06F 18/2411 | (2023.01) |
| G06F 18/2415 | (2023.01) |
| G06N 3/044 | (2023.01) |
| G06N 3/045 | (2023.01) |
| G06N 7/01 | (2023.01) |
| G06N 3/08 | (2023.01) |

(52) U.S. Cl.
CPC ...... *G06F 11/3608* (2013.01); *G06F 11/3628* (2013.01); *G06F 11/3636* (2013.01); *G06F 16/2237* (2019.01); *G06F 16/2264* (2019.01); *G06F 16/248* (2019.01); *G06F 16/2423* (2019.01); *G06F 16/24568* (2019.01); *G06F 16/254* (2019.01); *G06F 16/258* (2019.01); *G06F 16/283* (2019.01); *G06F 16/285* (2019.01); *G06F 16/288* (2019.01); *G06F 16/335* (2019.01); *G06F 16/906* (2019.01); *G06F 16/9038* (2019.01); *G06F 16/90332* (2019.01); *G06F 16/90335* (2019.01); *G06F 16/93* (2019.01); *G06F 17/15* (2013.01); *G06F 17/16* (2013.01); *G06F 17/18* (2013.01); *G06F 18/213* (2023.01); *G06F 18/214* (2023.01); *G06F 18/217* (2023.01); *G06F 18/2115* (2023.01); *G06F 18/2148* (2023.01); *G06F 18/2193* (2023.01); *G06F 18/22* (2023.01); *G06F 18/23* (2023.01); *G06F 18/24* (2023.01); *G06F 18/2411* (2023.01); *G06F 18/2415* (2023.01); *G06F 18/285* (2023.01); *G06F 18/40* (2023.01); *G06F 21/552* (2013.01); *G06F 21/60* (2013.01); *G06F 21/6245* (2013.01); *G06F 21/6254* (2013.01); *G06F 30/20* (2020.01); *G06F 40/117* (2020.01); *G06F 40/166* (2020.01); *G06F 40/20* (2020.01); *G06N 3/04* (2013.01); *G06N 3/044* (2023.01); *G06N 3/045* (2023.01); *G06N 3/08* (2013.01); *G06N 3/088* (2013.01); *G06N 5/00* (2013.01); *G06N 5/02* (2013.01); *G06N 5/04* (2013.01); *G06N 7/00* (2013.01); *G06N 7/01* (2023.01); *G06N 20/00* (2019.01); *G06Q 10/04* (2013.01); *G06T 7/194* (2017.01); *G06T 7/246* (2017.01); *G06T 7/248* (2017.01); *G06T 7/254* (2017.01); *G06T 11/001* (2013.01); *G06V 30/1985* (2022.01); *H04L 63/1416* (2013.01); *H04L 63/1491* (2013.01); *H04L 67/306* (2013.01); *H04L 67/34* (2013.01); *H04N 21/23412* (2013.01); *H04N 21/8153* (2013.01); *G06T 2207/10016* (2013.01); *G06T 2207/20081* (2013.01); *G06T 2207/20084* (2013.01)

(56) References Cited

U.S. PATENT DOCUMENTS

| | | | |
|---|---|---|---|
| 10,122,969 | B1 | 11/2018 | Lim |
| 10,212,428 | B2 | 2/2019 | Treple |
| 10,282,907 | B2 | 5/2019 | Miller |
| 10,482,607 | B1 | 11/2019 | Walters et al. |
| 10,595,060 | B2 | 3/2020 | Oya |
| 2009/0110070 | A1 | 4/2009 | Takahashi et al. |
| 2010/0254627 | A1 | 10/2010 | Panahpour Tehrani et al. |
| 2017/0236183 | A1 | 8/2017 | Klein et al. |
| 2017/0359570 | A1 | 12/2017 | Holzer et al. |
| 2018/0108149 | A1 | 4/2018 | Levinshtein |
| 2018/0115706 | A1 | 4/2018 | Kang et al. |
| 2018/0173958 | A1 | 6/2018 | Hu et al. |
| 2018/0199066 | A1 | 7/2018 | Ross et al. |
| 2018/0253894 | A1 | 9/2018 | Krishnan |
| 2019/0051051 | A1 | 2/2019 | Kaufman |
| 2019/0057509 | A1 | 2/2019 | Ly |

OTHER PUBLICATIONS

Xue, Tianfan, et al. "Visual dynamics: Probabilistic future frame synthesis via cross convolutional networks." Advances in Neural Information Processing Systems. 2016 (Year: 2016).

SYSTEMS AND METHODS FOR MOTION CORRECTION IN SYNTHETIC IMAGES

CROSS REFERENCE TO RELATED APPLICATIONS

This application is a continuation of U.S. patent application Ser. No. 16/658,858, filed Oct. 20, 2019, now U.S. Pat. No. 10,896,072, which is a continuation of U.S. patent application Ser. No. 16/263,839, filed Jan. 31, 2019, now U.S. Pat. No. 10,482,607, which claims the benefit of priority to U.S. Provisional Application No. 62/694,968, filed Jul. 6, 2018. The above-cited Applications are incorporated herein by reference in their entireties.

This application relates to U.S. patent application Ser. No. 16/151,385 filed on Oct. 4, 2018, and titled Data Model Generation Using Generative Adversarial Networks. This application also relates to U.S. patent application Ser. No. 16/173,374 filed Oct. 29, 2018. The disclosures of both of the aforementioned applications are incorporated herein by reference in their entirety.

BACKGROUND

Individuals, institutions, artists, video game makers, movie makers, researchers, and others may seek to generate synthetic videos and/or alter real videos by inserting synthetic objects that have synthetic motion. Synthetic videos include tutorials, motion pictures, video games, public displays (e.g., airport safety videos), training videos, and other applications. Synthetic videos may protect confidentiality, portray situations too dangerous to film in the real world, and/or portray impossible situations (e.g., epic fantasy scenes). Synthetic videos can reduce video production costs or otherwise meet video needs when live-videos are inadequate. However, tools generating synthetic realistic motion may not exist in some systems, and conventional systems of generating synthetic motion are limited resulting in high production costs and/or poor quality videos.

For example, conventional approaches to generating synthetic videos include using models to create a sequence of images that comprise a video. Some synthetic videos may be created by filming live action and mapping synthetic features onto the live action (e.g., altering physical appearance from a human to a non-human creature, or mapping synthetic objects onto real-world moving props). These methods of producing synthetic videos require tightly controlled filming conditions (e.g., using particular filming conditions or involving specialized equipment) and involve many people, leading to high production costs and long production times.

To address these problems, fully synthetic (computer generated) videos may be created. However, fully synthetic videos often suffer from unrealistic motion, including object distortion, or unnaturally abrupt (jerky) motion. For example, fully synthetic videos that depict a person walking may result in unrealistic arm, leg, torso, or head movements, or may result in distortions of facial features. In some systems, unrealistic motion arises because models used to generate motion are not based on underlying properties of motion and/or are not based on real videos.

Further, conventional synthetic videos often display problems associated with integrating synthetic objects into the video setting. For example, the shadows of a synthetic object in a video (e.g., synthetic shadows) may appear in an unrealistic position, with unrealistic shapes, and/or with unrealistic transparency. Synthetic objects may be unrealistically layered in front of or behind real objects or other synthetic objects. Synthetic objects may have unnatural or unwanted sizes or poses relative to background objects.

Therefore, in view of the shortcomings and problems with conventional approaches to synthetic video, there is a need for improved, unconventional systems that are low-cost, rapid systems to generate synthetic videos that portray realistic motion and address problems associated with integrating synthetic objects into a video setting.

SUMMARY

The disclosed embodiments provide unconventional methods and systems for generating synthetic videos. The unconventional disclosed embodiments provide enhancements to methods of generating synthetic videos because they may include training machine learning models based on features of underlying motion. For example, in some embodiments, machine learning models are trained using a sequence of difference images created by subtracting a set of preceding images in a video from a set of subsequent images. In this way, the systems disclosed herein realistically portray motion in synthetic videos. Further, embodiments generate realistic motion by implementing methods to scale, layer, and smooth synthetic objects into a static or a moving background.

The disclosed systems and methods may be implemented using a combination of conventional hardware and software as well as specialized hardware and software, such as a machine constructed and/or programmed specifically for performing functions associated with the disclosed method steps.

Consistent with the present embodiments, a system for generating synthetic videos is disclosed. The system may include one or more memory units storing instructions and one or more processors configured to execute the instructions to perform operations. The operations may include generating a static background image and determining the location of a reference edge in the static background image. The operations may include determining a perspective of an observation point and generating synthetic difference images. The synthetic difference images may include a respective synthetic object movement edge. The operations may include determining, for individual synthetic difference mages, a location of the respective synthetic object movement edge and generating adjusted difference images corresponding to the individual synthetic difference images. The adjusted difference images may be based on the corresponding individual synthetic difference images, the determined locations of the respective synthetic object movement edges of the corresponding individual synthetic difference images, the perspective of the observation point, and the location of the reference edge. The operations may include generating texturized images based on the adjusted difference images.

Consistent with the present embodiments, a method for generating synthetic videos is disclosed. The method may include generating a static background image and determining the location of a reference edge in the static background image. The method may include determining a perspective of an observation point and generating synthetic difference images. The synthetic difference images may include a respective synthetic object movement edge. The method may include determining, for individual synthetic difference mages, a location of the respective synthetic object movement edge and generating adjusted difference images corresponding to the individual synthetic difference images.

The adjusted difference images may be based on the corresponding individual synthetic difference images, the determined locations of the respective synthetic object movement edges of the corresponding individual synthetic difference images, the perspective of the observation point, and the location of the reference edge. The method may include generating texturized images based on the adjusted difference images.

Consistent with other disclosed embodiments, non-transitory computer readable storage media may store program instructions, which are executed by at least one processor device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DESCRIPTION OF THE EMBODIMENTS

Reference will now be made in detail to exemplary embodiments, examples of which are illustrated in the accompanying drawings and disclosed herein. Wherever convenient, the same reference numbers will be used throughout the drawings to refer to the same or like parts.

The embodiments provide unconventional systems and methods for generating synthetic video with realistic motion. As compared to conventional approaches, disclosed embodiments generate videos with more realistic motion, and more realistic integration into the environment. In some embodiments, disclosed systems and methods may generate videos of synthetic people (i.e., synthetic objects that resemble people) and their shadows moving in front of a real object (e.g., people walking into and using an ATM). In some embodiments, systems and methods may generate videos of synthetic people and shadows moving against a backdrop of real motion (e.g., a video of a synthetic pedestrian on a sunny day inserted into a video of a real-life sidewalk). In some embodiments, the synthetic objects and/or background objects may appear to not comprise real-world objects. For example, the objects may be cartoons, fantasy creatures (e.g., dragons), and/or unknown or unnatural objects (e.g., starships). As one of skill in the art will appreciate, disclosed embodiments are not limited to these examples and may involve any synthetic object and/or real-life objects.

Figure 1:
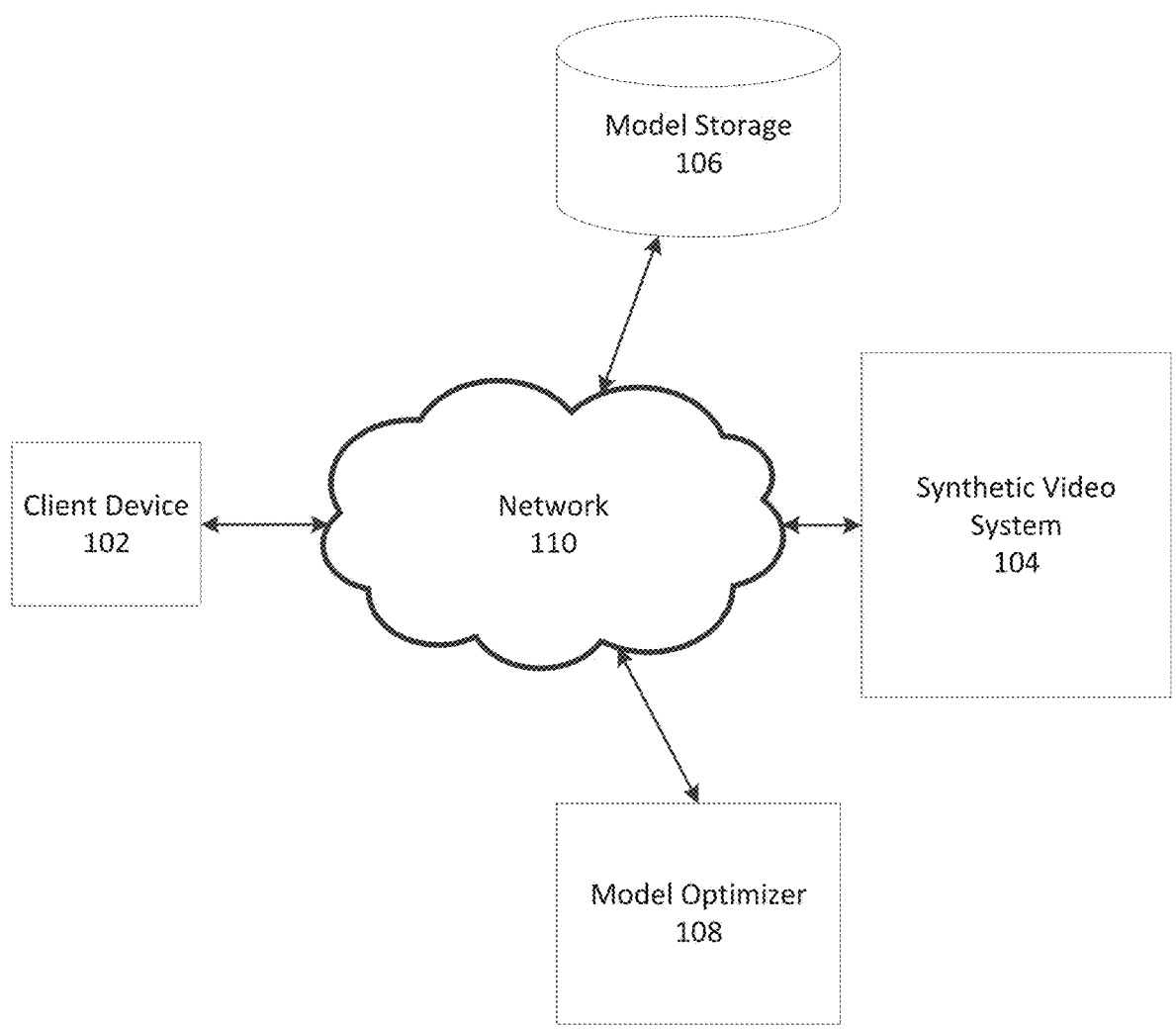
FIG. 1 is a diagram of an exemplary system for generating synthetic videos, consistent with disclosed embodiments.

FIG. 1 is a diagram of exemplary system 100 for generating synthetic video. As shown, system 100 may include a client device 102, a synthetic video system 104, a model storage 106, and a model optimizer 108. Components of system 100 may be connected to each other through a network 110.

In some embodiments, aspects of system 100 may be implemented on one or more cloud services designed to generate (spin-up) one or more ephemeral container instances in response to event triggers (e.g., a notification, a request, a job result), assign one or more tasks to a container instance, and terminate (spin-down) a container instance upon completion of a task. By implementing methods using cloud services, disclosed systems efficiently provision resources based on demand and provide security advantages because the ephemeral container instances may be closed and destroyed upon completion of a task. That is, the container instances prevent attempts to access the container and do not permit access from outside using terminals or remote shell tools like SSH, RTP, FTP, or Curl, for example. Further, terminating container instances may include destroying data, thereby protecting sensitive data. Destroying data can provide security advantages because it may involve permanently deleting data (e.g., overwriting data) and associated file pointers.

As will be appreciated by one skilled in the art, the components of system 100 can be arranged in various ways and implemented with any suitable combination of hardware, firmware, and/or software, as applicable. For example, as compared to the depiction in FIG. 1, system 100 may include a larger or smaller number client devices, synthetic video systems, model storage, or model optimizers. In addition, system 100 may further include other components or devices not depicted that perform or assist in the performance of one or more processes, consistent with the disclosed embodiments. The exemplary components and arrangements shown in FIG. 1 are not intended to limit the disclosed embodiments.

Referring to FIG. 1, client device 102 may include one or more memory units and one or more processors configured to perform operations consistent with disclosed embodiments. In some embodiments, client device 102 may include hardware, software, and/or firmware modules. Client device 102 may be a digital camera device, a storage device, a terminal, a kiosk, a mobile device, a tablet, a personal computer, a server, a server cluster, or a specialized device configured to perform methods according to disclosed embodiments, or the like. An exemplary embodiment of client device 102 is described below in greater detail.

Client device 102 may be connected to network 110 or directly connected to synthetic video system 104 (not shown). For example, client device 102 may connect to network 110 (or other component of system 100) by at least one of a wireless connection or a wired connection. In some embodiments, the wireless connection may include at least one of a Wi-Fi connection, a Bluetooth connection, a Li-Fi connection, an optical wireless connection, a Near Field Communication (NFC) connection, or another wireless connection. In some embodiments, the wired connection includes at least one of a Universal Serial Bus (USB) connection, a Firewire connection, an ethernet connection, or another cable connection.

Referring again to FIG. 1, system 100 may include synthetic video system 104. In some embodiments, some or all components of synthetic video system 104 may be hosted on one or more servers, one or more clusters of servers, or one or more cloud services. Synthetic video system 104 may include processors and memory units, the processors configured to perform operations consistent with disclosed embodiments. Synthetic video system 104 may be connected to network 110 and may additionally be connected to client device 102, model storage 106, and/or model optimizer 108. Synthetic video system 104 is described in greater detail below.

System 100 may include model storage 106. In some embodiments, some or all components of model storage 106 may be hosted on one or more servers, one or more clusters of servers, or one or more cloud services. Model storage 106 may be connected to network 110 and may additionally be directly connected to synthetic video system 104 (not shown). In some embodiments, model storage 106 may be a component of synthetic video system 104 or client device 102 (not shown).

Model storage 106 may include one or more databases configured to store data models (e.g., machine learning models or statistical models) and descriptive information of the data models. Model storage 106 may be configured to provide information regarding available data models to a user or another system. The databases may include cloud-based databases, cloud-based buckets, or on-premises databases. The information may include model information, such as the type and/or purpose of the model and any measures of model error (e.g., a likelihood, a confidence interval, a regression result, or the like).

System 100 may include model optimizer 108. Model optimizer 108 may include one or more computing systems configured to manage training of data models for system 100, consistent with disclosed embodiments. Model optimizer 108 may be configured to generate models for export to other components of system 100 or to other components not shown. In some embodiments, model storage 106 may be a component of synthetic video 104 or client device 102 (not shown).

Model optimizer 108 may be configured to generate data models and/or other models based on instructions received from a user or another system. For example, model optimizer 108 can be configured to receive a visual (graphical) depiction of a machine learning model and parse that graphical depiction into instructions for creating and training a corresponding neural network. Model optimizer 108 can be configured to select model training parameters. This selection can be based on model performance feedback produced by model optimizer 108 during model training and/or received from another component of system 100. Model optimizer 108 can be configured to provide trained models and descriptive information concerning the trained models to model storage 106.

Model optimizer 108 may be configured to train machine learning models by optimizing model parameters and/or hyperparameters (hyperparameter tuning) using an optimization technique, consistent with disclosed embodiments. Model parameters may include weights, coefficients, offsets, or the like. Training can be supervised or unsupervised. Hyperparameters can include training parameters, which can affect how training of the model occurs, or architectural hyperparameters, which can affect the structure of the model. Training parameters may include a learning rate, batch size, number of training batches, number of epochs, chunk size, time window, input noise dimension, or the like. Architectural hyperparameters may include the number of layers in a neural network, the choice of activation function for a neural network node, the layers in a CNN, for example. The optimization technique may include a grid search, a random search, a gaussian process, a Bayesian process, a Covariance Matrix Adaptation Evolution Strategy (CMA-ES), a derivative-based search, a stochastic hill-climb, a neighborhood search, an adaptive random search, or the like.

As shown in FIG. 1, at least one of a client device 102, a synthetic video system 104, a model storage 106, and a model optimizer 108 may connect to network 110. Network 110 may be a public network or private network and may include, for example, a wired or wireless network, including, without limitation, a Local Area Network, a Wide Area Network, a Metropolitan Area Network, an IEEE 1002.11 wireless network (e.g., "Wi-Fi"), a network of networks (e.g., the Internet), a land-line telephone network, or the like. In some embodiments, network 110 may be a secure network and require a password to access the network.

Figure 2:
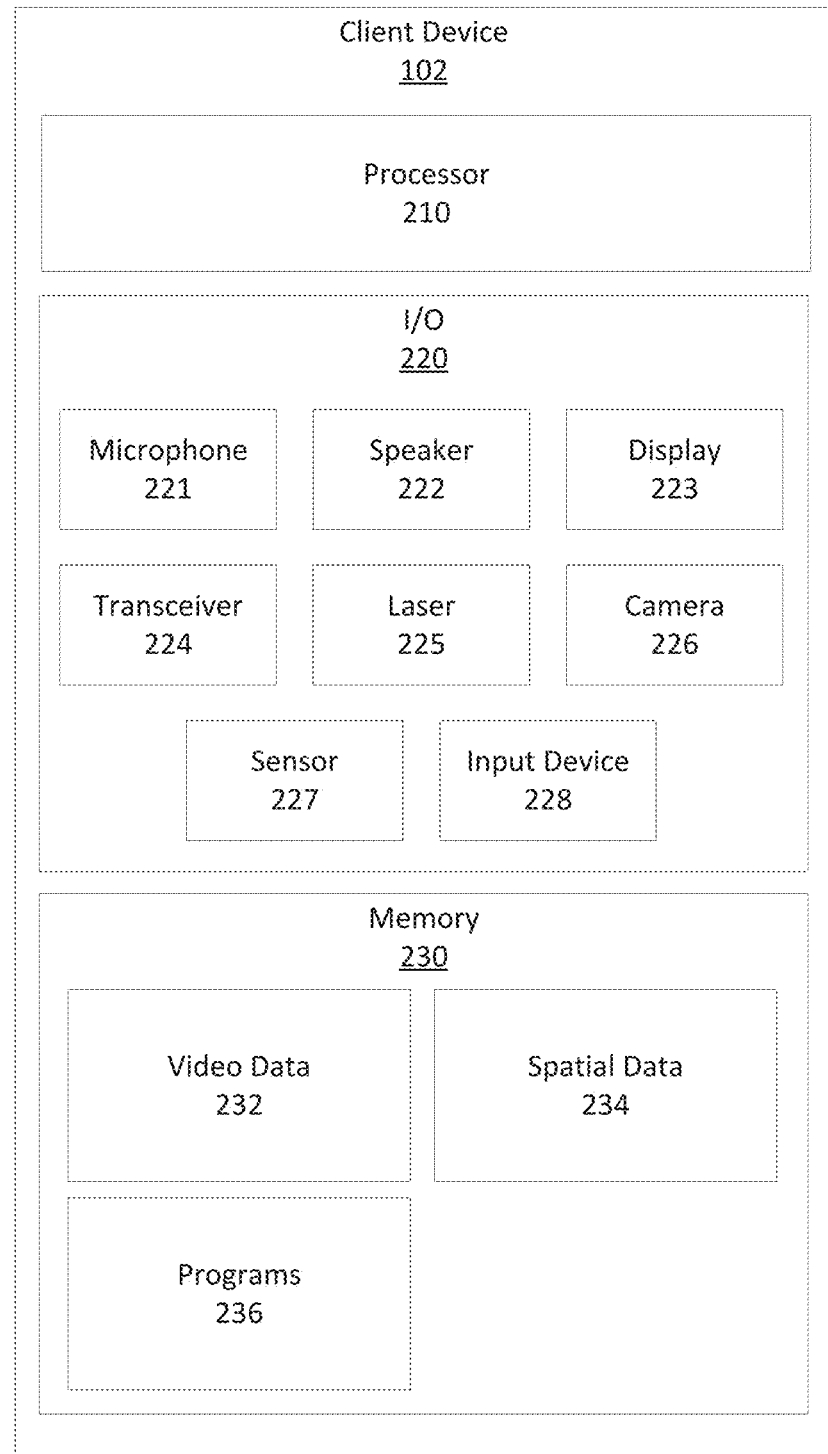
FIG. 2 is an illustration of an exemplary client device, consistent with disclosed embodiments.

FIG. 2 is a diagram of exemplary client device 102, consistent with disclosed embodiments. Client device 102 may be a storage device, a terminal, a kiosk, a mobile device, a tablet, a personal computer, a server, a server cluster, a specialized device configured to perform methods according to disclosed embodiments, or the like.

As depicted in FIG. 2, client device 102 may include one or more processors 210, input/output units (I/O devices) 220, and one or more memory units 230. FIG. 2 is an exemplary configuration of client device 102. As will be appreciated by one skilled in the art, the components and arrangement of components included in client device 102 may vary. For example, as compared to the depiction in FIG. 2, client device 102 may include a larger or smaller number of processors 210, I/O devices 220, or memory units 230. In addition, client device 102 may further include other components or devices not depicted that perform or assist in the performance of one or more processes consistent with the disclosed embodiments. The components and arrangements shown in FIG. 2 are not intended to limit the disclosed embodiments, as the components used to implement the disclosed processes and features may vary.

Processor 210 may include known computing processors, including a microprocessor. Processor 210 may include a single-core or multiple-core processor that executes parallel processes simultaneously. For example, processor 210 may include a single-core processor configured with virtual processing technologies. In some embodiments, processor 210 may use logical processors to simultaneously execute and control multiple processes. Processor 210 may implement virtual machine technologies, or other known technologies to provide the ability to execute, control, run, manipulate, store, etc., multiple software processes, applications, programs, etc. In another embodiment, processor 210 may include a multiple-core processor arrangement (e.g., dual core, quad core, etc.) configured to provide parallel processing functionalities to allow execution of multiple processes simultaneously. One of ordinary skill in the art would understand that other types of processor arrangements may be implemented that provide for the capabilities disclosed herein. The disclosed embodiments are not limited to any type of processor(s) 210. Processor 210 may execute various instructions stored in memory 230 to perform various functions of the disclosed embodiments described in greater detail below. Processor 210 may be configured to execute functions written in one or more known programming languages.

Referring again to FIG. 2, I/O devices 220 may include components of an interface, such as a user interface. I/O devices 220 may include a microphone 221, a speaker 222, a display 223, a transceiver 224, a laser 225, a camera 226, sensor 227 and/or input device 228. I/O devices 220 may include other I/O devices, not depicted, that perform or assist in the performance of one or more processes consistent with disclosed embodiments. In some embodiments, some or all of I/O devices 220 may be mounted to client device 102. In some embodiments, some or all of I/O devices 220 may be components of stand-alone devices communicatively coupled to client device 102.

Microphone 221 may be configured to receive an audio signal. In some embodiments, microphone 221 may include a microphone array. Microphone 221 may be mounted to client device 102 or may be communicatively coupled to client device 102 (e.g., a wired headset, wireless microphone, or the like).

Speaker 222 may include components configured to provide audio output. In some embodiments, speaker 222 may include an array of speakers.

Display 223 may include a light-emitting component, such as a light emitting diode (LED) or other component capable of providing a visible signal to a user. In some embodiments, display 223 may include at least one of a monitor, an LCD display, an LED display, a touch screen, a lamp, a projector, or another visual display.

Transceiver 224 may include a transceiver configured to connect with at least one of any type of cellular data network, or at least one of a Wi-Fi transceiver, a Li-Fi transceiver, Near Field Communication (NFC) transceiver, a radio transceiver, an ultra-high frequency (UHF) transceiver, a Bluetooth transceiver, an infrared transceiver, or other wireless transceiver.

Laser 225 may include a device configured to generate a laser beam and/or receive reflected laser light to determine the position of objects. Laser 225 may include a LIDAR (Light Detection and Ranging) laser and sensor.

Camera 226 may include a video camera, a still-image camera configured to take photographs, or a 3D (three dimensional) image scanner. Camera 226 may include a lens and a digital imaging device such as a charge couple device (CCD) sensor. In some embodiments, camera 226 may include a 3D scanner adapted to transmit and/or receive light signals for the detection of the 3D shape of an object. For example, camera 226 may be configured to detect the 3D shape using any suitable technique, for example, light coding, stereo imaging, time-of-flight, etc. In some embodiments, camera 226 may be configured as a 3D camera with a light pattern transmitter (e.g., using infrared light). Camera 226 may be configured to project a pattern of light from the light transmitter onto objects, capture an image of the projected pattern of light, and then translate the distortions in the pattern into a 3D information (e.g., using the distortions to determine the distance of various points in the video setting from the 3D camera by comparing the distortions to the known projected pattern).

Sensor 227 may include, for example, a location sensor (e.g., a global positioning system (GPS) sensor, a magnetometer, or an altimeter), a light sensor, an audio sensor, or a motion sensor (e.g., a gyroscope, an accelerometer, a light-based motion detector).

Input device 228 may include at least one of a touchpad, a touch screen, a keyboard, a mouse, a track pad, a button, a dial, a knob, a switch, a location sensor, a fingerprint scanner, a retinal scanner, a hand scanner, a biometric input device, or the like. As will be appreciated by one of skill in the art, input device 228 may be any device capable of receiving inputs, including user inputs, to perform or assist in performing methods consistent with disclosed embodiments.

Referring again to FIG. 2, memory 230 may be a volatile or non-volatile, magnetic, semiconductor, optical, removable, non-removable, or other type of storage device or tangible (i.e., non-transitory) computer-readable medium, consistent with disclosed embodiments. As shown, memory 230 may include video data 232, spatial data 234, and programs 236. Data stored in memory 230 may be comprised of at least one of encrypted data or unencrypted data.

Video data 232 may comprise data captured by camera 226, from another component of system 100, and/or otherwise received in memory 230 (e.g., data downloaded from a third-party website; data received from a remote device). Video data 232 may be synthetic video data or real video data. Video data 232 may include a set of images (frames) representing images taken over one continuous time period (a clip), or discrete sets of image, each representing video taken over a different time periods (e.g., a series of clips). Video data 232 may include static image data (e.g., a digital photograph). Video data 232 may include metadata, labels, and/or tags that describe data, including clips and/or images. Video data may include camera information (e.g., pixel properties, light filter information, aperture information, shutter speed information, or the like). In some embodiments, video data 232 may include one or more databases comprising an organized or structured collection of tables, queries, objects, schema, reports, views, or the like.

Spatial data 234 may include image edge data, object data, and edge location data, object location data, object size data, edge size data, camera depth data (e.g., as discovered via laser, estimations, multi-lens photos, or other means) and/or other spatial data, consistent with disclosed embodiments. Spatial data may include observation point data (e.g., perspectives, positions, zooms, viewing angles, etc.). Observation point data may be associated with a camera. Spatial data may include light source data (e.g., a light source brightness, a light source wavelength(s), and/or other properties of a light source). Spatial data 234 may include location data, Global Positioning System Data, accelerometer data, magnetometer data. Spatial data 234 may include data generated using programs 236. Spatial data 234 may include data collected from another component of system 100 and/or otherwise received in memory 230 (e.g., data downloaded from a third-party website; data received from a remote device). Spatial data 234 may include metadata, labels, and/or tags that describe spatial data. In some embodiments, spatial data 234 includes one or more databases comprising an organized or structured collection of tables, queries, objects, schema, reports, views, or the like.

Programs 236 may store one or more programs (e.g., modules, code, scripts, or functions) used to perform methods consistent with disclosed embodiments. Programs may include operating systems (not shown) that perform known operating system functions when executed by one or more processors. Disclosed embodiments may operate and function with computer systems running any type of operating system. Programs 236 may be written in one or more programming or scripting languages. One or more of such software sections or modules of memory 230 can be integrated into a computer system, non-transitory computer-readable media, or existing communications software. Programs 236 can also be implemented or replicated as firmware or circuit logic.

Programs 236 may include programs configured for methods of image and video processing, consistent with disclosed embodiments. For example, programs 236 may include programs to scale or crop an image. Programs 236 may include programs to convert video data between various formats (e.g., .MP4, .GIF, .VOB, .WEBM, .MOV, .QT, .WMV, .MPG, .MPEG, .SVI, .FLV, .F4V, .MKV, and/or other formats). Programs 236 may include programs to convert image data between various formats, including raster formats, vector formats, compound formats, and/or stereo formats (e.g., .JPEG, .JPG, .TIFF, .GIF, .BMP, .PNG, .CGM, .SVG, or other formats). Programs 236 may include programs capable of adjusting image and/or video properties. For example, programs 236 may include programs capable of adjusting a luminance, smoothing an image, changing a tint or color, sharpening an image, changing a contrast, changing a hue or saturation, and/or other image and/or video adjustments. Programs 236 may include methods of shortening and/or combining video clips. Programs 236 may include methods for combining images or inserting image objects (real or synthetic) into images. As one of skill in the art will appreciate, programs 236 may include other known methods of processing images and/or videos.

Programs 236 may include algorithms for normalizing an image, edge detection, object detection, pose estimation, and/or texturizing an image, consistent with disclosed embodiments. Programs 236 may include programs configured to implement methods of homography (i.e., methods of spatially relating image data), consistent with disclosed embodiments. Programs 236 may include programs configured to merge images, consistent with disclosed embodiments.

Figure 3:
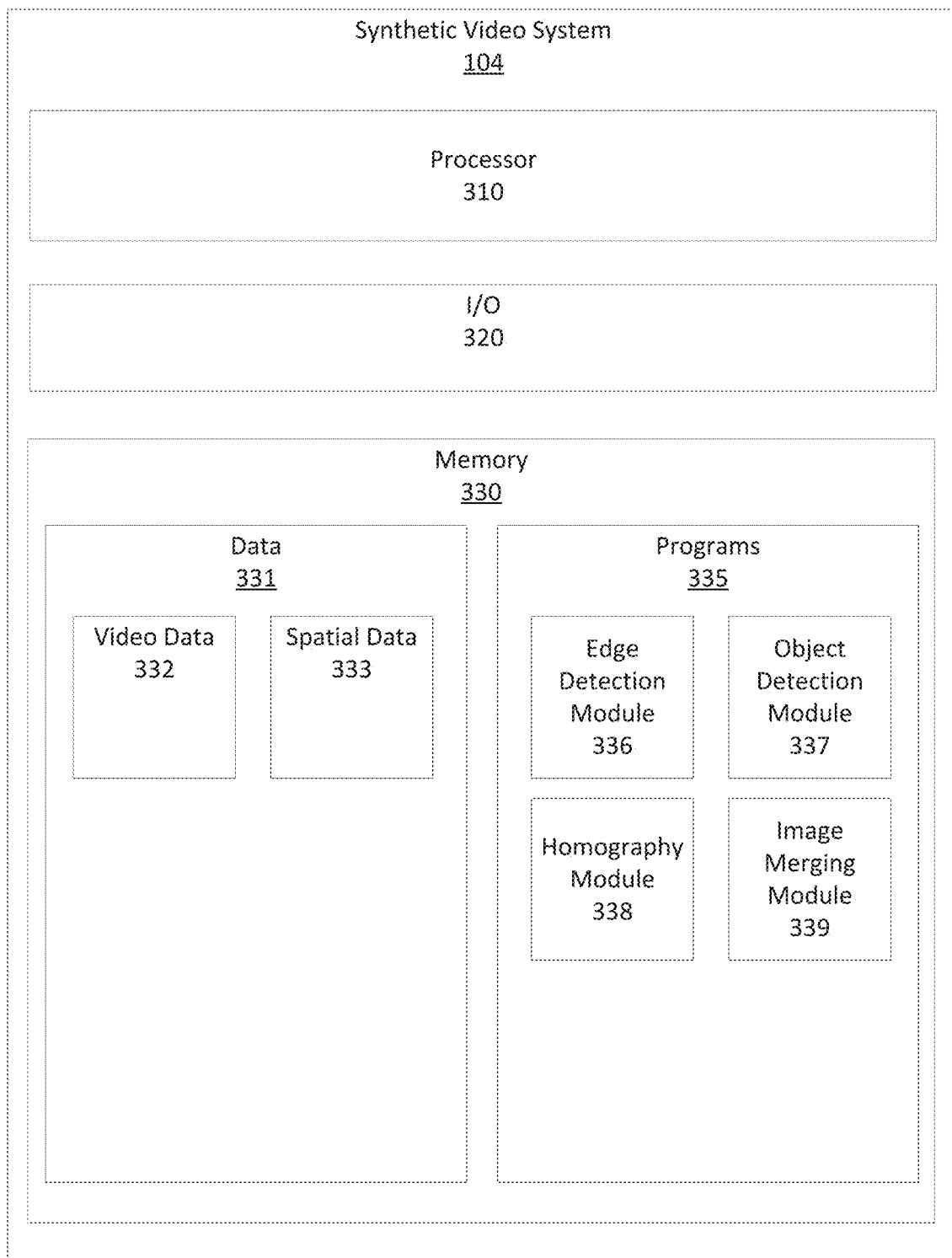
FIG. 3 is an illustration of an exemplary synthetic video system, consistent with disclosed embodiments.

FIG. 3 is a diagram of exemplary synthetic video system 104, consistent with disclosed embodiments. As shown, synthetic video system 104 includes one or more processors 310, one or more I/O devices 320, and one or more memory units 330. In some embodiments, some or all components of synthetic video system 104 may be hosted on a device, a computer, a server, a cluster of servers, or a cloud service. In some embodiments, synthetic video system 104 is a scalable system configured to efficiently manage resources and enhance security by provisioning computing resources in response to triggering events and terminating resources after completing a task (e.g., a scalable cloud service that spins up and terminates container instances).

Processors 310 may include one or more known computing processors, as described above. One of ordinary skill in the art would understand that other types of processor arrangements could be implemented that provide for the capabilities disclosed herein. The disclosed embodiments are not limited to any type of processor(s) configured in synthetic video system 104. Processor 310 may execute various instructions stored in memory 330 to perform various functions of the disclosed embodiments described in greater detail below. Processor 310 is configured to execute functions written in one or more programming languages.

I/O devices 320 may include components to connect to network 110 and to send data to and/or receive data from other components of system 100 (e.g., via a transceiver). I/O devices 320 may include at least one of a display, an LED, a router, a touchscreen, a keyboard, a microphone, a speaker, a haptic device, a camera, a button, a dial, a switch, a knob, a transceiver, an input device, an output device, or another I/O device to perform methods of the disclosed embodiments. I/O devices 320 may be components of an interface of synthetic video system 104 (e.g., a user interface).

Still referring to FIG. 3, synthetic video system 104 may include memory 330, including one or more memory units, as described above. One or more software sections or modules of memory 330 can be integrated into a computer system, non-transitory computer-readable media, or existing communications software. The programs, modules, or code can also be implemented or replicated as firmware or circuit logic.

As shown, memory 330 may include data 331 and programs 335. In some embodiments, data 331 includes one or more databases comprising an organized or structured collection of tables, queries, objects, schema, reports, views, or the like. Data 331 may include stored data associated with a user or a user profile. As shown, data 331 includes video data 332 and spatial data 333.

Video data 332 may comprise data captured by a camera, from another component of system 100, and/or otherwise received in memory 330 (e.g., data downloaded from a third-party website; data received from a remote device). Video data 332 may be synthetic video data or real video data. Video data 332 may include a clip, or a series of clips, as described above. Video data 332 may include static image data (e.g., a digital photograph). Video data 332 may include metadata, labels, and/or tags that describe data, including clips and/or images. Video data may include camera information (e.g., pixel properties, light filter information, aperture information, shutter speed information, or the like). In some embodiments, video data 332 includes one or more databases comprising an organized or structured collection of tables, queries, objects, schema, reports, views, or the like.

Spatial data 334 may include image edge data, object data, and edge location data, object location data, object size data, edge size data, or other spatial data, consistent with disclosed embodiments. Spatial data may include observation point data (e.g., perspectives, positions, zooms, viewing angles). Observation point data may be associated with a camera. Spatial data may include light source data (e.g., a light source brightness, a light source wavelength(s), and/or other properties of a light source). Spatial data 334 may include location data, Global Positioning System Data, accelerometer data, magnetometer data. Spatial data 334 may include data generated using programs 335. Spatial data 334 may include data collected from another component of system 100 and/or otherwise received in memory 330 (e.g., data downloaded from a third-party website; data received from a remote device). Spatial data 334 may include metadata, labels, and/or tags that describe spatial data. In some embodiments, spatial data 334 includes one or more databases comprising an organized or structured collection of tables, queries, objects, schema, reports, views, or the like.

Programs 335 may include programs (e.g., modules, code, scripts, or functions), consistent with disclosed embodiments. Programs 335 may be configured to perform a task in response to a triggering event. For example, in response to a triggering event such as the receipt of input data from one component of system 100 (e.g., from client device 102), programs 335 may be configured to generate (spin-up) an ephemeral container instance to perform one or more tasks. Programs 335 may be configured to assign a task to a previously generated container instance (i.e., a warm container instance). Programs 335 may include an Application Programming Interface (API). Programs 335 includes an edge detection module 336, an object detection module 337, a homography module 338, and an image merging module 339.

In some embodiments, modules of programs 335 are configured to retrieve a model from a model storage (e.g., model storage 106) and/or receive an optimized model from a model optimizer (e.g., model optimizer 108). In some embodiments, modules of programs 335 are configured to train machine learning models or optimize statistical models. In some embodiments, modules of programs 335 are configured to submit a model training request to a model optimizer, e.g., model optimizer 108. In some embodiments, modules of programs 335 are configured to process received image data and/or video data and/or to update stored image data and/or video data.

Programs 335 may include programs configured for methods of image and video processing, consistent with disclosed embodiments. For example, programs 335 may include programs to scale or crop an image. Programs 335 may include programs to convert video data between various formats (e.g., .MP4, .GIF, .VOB, .WEBM, .MOV, .QT, .WMV, .MPG, .MPEG, .SVI, .FLV, .F4V, or other formats). Programs 335 may include programs to convert image data between various formats, including raster formats, vector formats, compound formats, and stereo formats (e.g., .JPEG, .JPG, .TIFF, .GIF, .BMP, .PNG, .CGM, .SVG, or other formats). Programs 335 may include programs capable of adjusting image and/or video properties. For example, programs 335 may include programs capable of adjusting a luminance, smoothing an image, changing a tint or color, sharpening an image, changing a contrast, changing a hue or saturation, and/or other image and/or video adjustments. Programs 335 may include methods of shortening and/or combining video clips. Programs 335 may include methods for combining images or inserting image objects (real or synthetic) into images. As one of skill in the art will appreciate, programs 335 may include other known methods of processing images and/or videos.

Programs 335 may include methods for normalizing images, consistent with disclosed embodiments. Normalizing images may include background subtraction and/or edge detection, consistent with disclosed embodiments. Normalizing images may include aligning similar objects in the video data to correct for camera jitter, variation in camera position or angle, or other disturbances to the video data. Normalizing images may include, for individual images, rotating, cropping, zooming, or otherwise adjusting the image to match features of a reference image. Normalizing images may be performed using one or more image registration algorithms. Normalization may include adjusting one or more image parameters of the images. The image parameters may include at least one of image color, tint, contrast, or the like. For example, normalization may include transforming an image from a color image into a black and white image. Normalization may include other image processing techniques (e.g., changing sharpness, contrast, shadows, highlights of all or part of an image). As one of skill in the art will appreciate, programs 335 may include still other image processing techniques to normalize images.

Programs 335 may include methods for texturizing images, consistent with disclosed embodiments. Texturizing an image may be based on edge density and edge direction. For example, programs 335 may be configured to generate a plurality of "skins" for synthetic persons. For example, programs 335 may include algorithms to render a plurality of synthetic clothing items and/or features based on the same edge and object data (e.g., noses, eyes, ears, horns, or other features). Texturizing an image may include transforming a difference image that indicates motion between a first and second images into a static image representing the position of objects in the second image. Texturizing an image may involve using machine learning models including at least one of an autoencoder model, an encoder model, a decoder model, a neural network model, a convolutional neural network (CNN) model, a recurrent neural network (RNN) model, a generative adversarial model (GAN), Spatial GANs, Periodic Spatial GANs, CNNs, and/or other model. RNNs may include a number of nodes, a number of layers, an activation function, a weight, and other properties known in the art. CNNs may include an input layer, an output layer, and one or more hidden layers. Hidden layers of a CNN may include a convolutional layer, an activation function layer (e.g., a rectified linear unit (ReLU) layer), a pooling layer, a fully connected layer, and/or a normalization layer.

Edge detection module 336, includes algorithms for edge detection in images, consistent with disclosed embodiments. For example, edge detection module 336 may be configure to implement a Gaussian smoothed step edge (error function) method, a search-based method, a zero-crossing based method, a gradient method, a stochastic gradient method, a Laplacian method, a Canny method, a first-order method, a thresholding method, a second-order method, a differential method, a Fuzzy Logic method, a phase congruency method, a subpixel method (curve-fitting, moment-based, reconstructive, partial area effect), a Sobel method, and/or other edge detection methods. Edge detection module 336 may be configured to train and/or implement edge detection models, consistent with disclosed embodiments. Edge detection module 336 may store and/or retrieve edge detection models from storage (e.g., memory 330, model storage 106).

Object detection module 337, includes algorithms for object detection, consistent with disclosed embodiments. For example, object detection module 337 may include machine-learning approaches and/or deep learning approaches to object detection. In some embodiments, object detection module 337 is configured to implement scale-invariant feature transform models, histogram of oriented gradients models, region-based convolutional neural network (R-CNN) models, fast R-CNN models, region-based Fully Convolutional Network models (R-FCN), You Only Look Once (YOLO) models, Single-Shot Detector (SSD) models, Neural Architecture Search Net (NASNet) models, Mask Region-based Convolutional Network (Mask R-CNN) models, or other object detection models. Object detection module 337 may include face recognition models. Object detection module 337 may include datasets of known objects for model training (e.g., people, household items, equipment, tools, furniture, buildings, vehicles, animals, plants, or other objects). Object detection module 337 may be configured to train and/or implement object detection models, consistent with disclosed embodiments. Object detection module 337 may store and/or retrieve object detection models from storage (e.g., memory 330, model storage 106).

Homography module 338 includes algorithms to implement methods of homography and pose estimation, consistent with disclosed embodiments. Homography module 338 may be configured to implement affine homography methods, plane-to-plane equation methods, or other geometric methods to generate spatial information regarding image data. Homography module 338 may include algorithms to transform image data between observation points (e.g., homogeneous coordinate methods). Homography module 338 may include lighting algorithms (e.g., illumination models, ray tracing, radiosity, or other lighting algorithms). Homography module 338 may include programs to implement methods of pose estimation, including analytic or geometric methods, genetic algorithm methods, and/or machine learning methods.

Homography module 338 may include machine learning models (e.g., CNN models, RNN models, or other machine learning models), consistent with disclosed embodiments. Homography module 338 may be configured to train and/or implement machine learning models, consistent with disclosed embodiments. Homography module 338 may store and/or retrieve models from storage (e.g., memory 330, model storage 106).

Homography module 338 may determine the location of edges, objects, and/or light sources, and/or may determine the perspective of observation points (positions, zooms, viewing angles), consistent with disclosed embodiments. Homography module 338 may include datasets of known sizes of an object, average sizes of an object, or distribution of sizes of an object. As an example, homography module 338 may generate spatial data based on the edges, objects, observation points, and light source information. For example, based on a known or estimated size of an object (e.g., an automobile model size, a tire size, an average height of a human male, the average length of a tie), homography module 338 may use geometric methods to generate spatial data relating to a plurality of edges, objects, light sources, and/or observation points in an image. In some embodiments, homography module 338 generates a three-dimensional spatial model of an image.

Image merging module 339 includes programs to merge images and image objects, consistent with disclosed embodiments. Image merging module 339 may include programs configured to implement methods of gradient domain image processing, image stitching, or other image merging methods. For example, image merging module 339 may include finite difference or Sobel methods. Image merging module 339 may include algorithms for constructing a new image from an existing image by integrating the gradient (difference between neighboring pixels).

Figure 4:
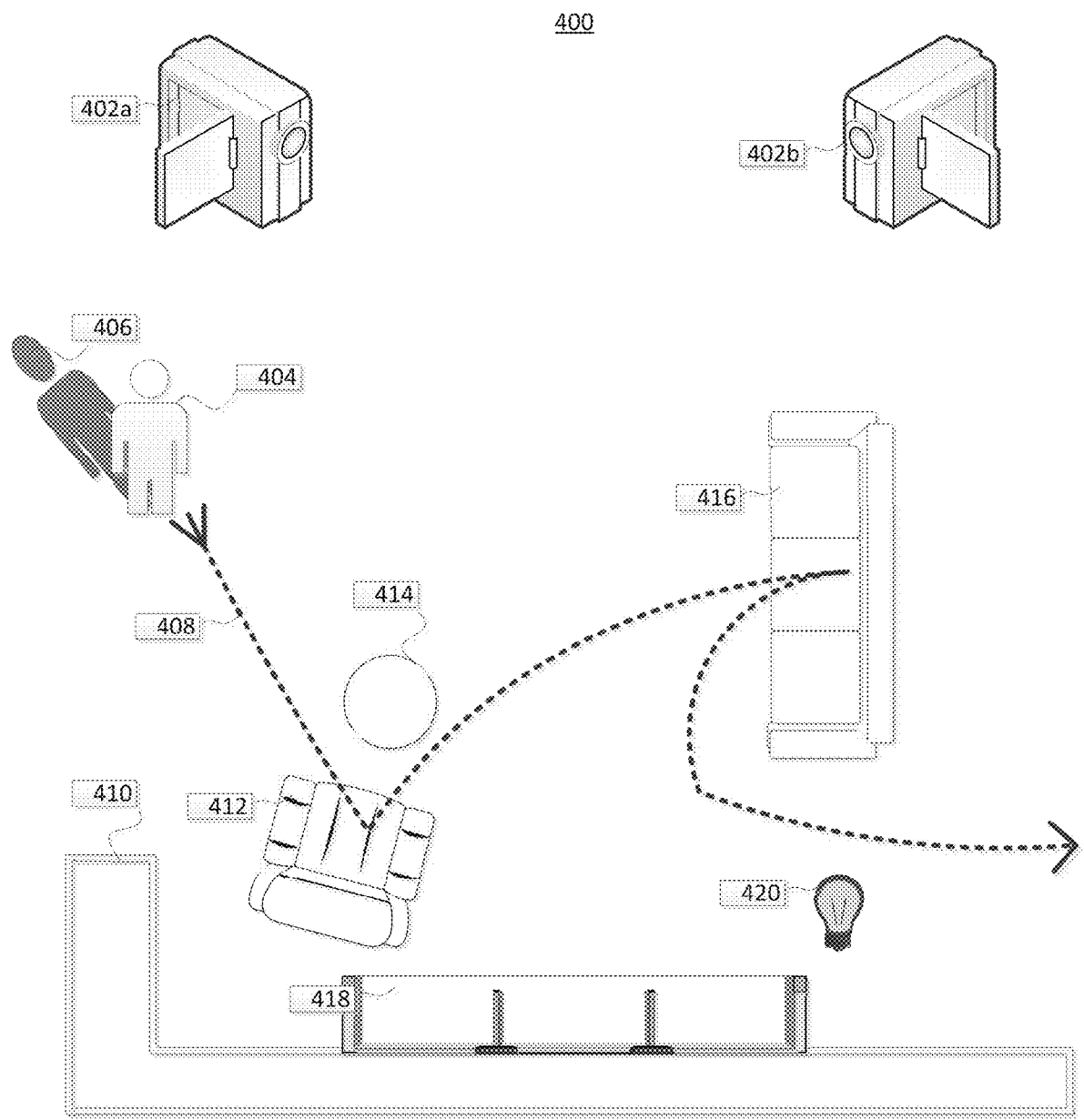
FIG. 4 is a diagram of an exemplary configuration of a video setting, consistent with disclosed embodiments.

FIG. 4 is a diagram of an exemplary configuration of a three-dimensional video setting 400, consistent with disclosed embodiments. As shown, video setting 400 includes a synthetic person 404, a synthetic shadow 406, and a path 408. Video setting 400 also includes a plurality of objects that includes a wall 410, a chair 412, a table 414, a couch 416, and a bookshelf 418. The plurality of objects may be based on images of real objects in a real-world location and/or may be synthetic objects. As shown, video setting 400 includes observation points 402a and 402b having respective perspectives (positions, zooms, viewing angles), and light source 420.

FIG. 4 is provided for purposes of illustration only and is not intended to limit the disclosed embodiments. For example, as compared to the depiction in FIG. 4, system video setting 400 may include a larger or smaller number of objects, synthetic persons, synthetic shadows, paths, light sources, and/or observation points. In addition, video setting 400 may further include additional or different objects, synthetic persons, synthetic shadows, paths, light sources, observation points, and/or other elements not depicted, consistent with the disclosed embodiments.

In some embodiments, observation points 402a and 402b are virtual observation points, and synthetic videos in video setting 400 are generated from the perspective of the virtual observation points. In some embodiments, observation points 402a and 402b are observation points associated with real cameras. In some embodiments, the observation points are may be fixed. In some embodiments, the observation points may change perspective by panning, zooming, rotating, or otherwise change perspective.

In some embodiments, observation point 402a and/or observation point 402b may be associated with real cameras having known perspectives of their respective observation points (i.e., known camera position, known camera zoom, and known camera viewing angle). In some embodiments, a device comprising a camera associated with observation point 402a and/or observation point 402b may transmit data to an image processing system (e.g., client device 102 and/or synthetic video system 104). In some embodiments, the image processing system may generate spatial data of video setting 400 based on the captured image data, consistent with disclosed embodiments. For example, using methods of homography, the program may detect object edges, identify objects, and/or determine distances between edges in three dimensions.

In some embodiments, in a synthetic video generated for video setting 400, synthetic person 404 may follow path 408 to walk to chair 412, sit on chair 412, walk to couch 416, sit on couch 416, then walk to exit to the right. In some embodiments, synthetic person 404 may interact with objects in video scene 400 (e.g., move table 414; take something off bookshelf 418). Synthetic video system 104 may generate synthetic person 404, consistent with disclosed embodiments.

In some embodiments, synthetic video system 104 may determine the relative position and pose of synthetic person 404 with respect to observation point 402a, observation point 402b, and/or one or more of the plurality objects of scene 400. From the perspective of different observation points, synthetic person 404 may appear in different poses and at different sizes as synthetic person 404 travels path 408. Synthetic video system 104 may use a combination of edge detection methods, object detection methods, homography methods, and pose estimation methods to determine position and pose (e.g., as performed by edge detection module 336, object detection module 337, and/or homography module 338).

Synthetic video system 104 may scale (change the size) of synthetic person 404. Synthetic person 404 may be closer to observation point 402a at some points on path 408 and closer to observation point 402b at other points. Accordingly, synthetic video system 104 may scale an edge associated with synthetic person 404 based on the determination of relative position and pose of synthetic person 404.

Synthetic video system 104 may layer synthetic person 404 with an object in video setting 400 based on the observation point. For example, while synthetic person 404 sits on chair 412, synthetic video system 104 may layer the legs of synthetic person 404 behind table 414 from observation point 402b, but not from the perspective of observation point 402a. As another example, from the perspective of observation point 402a and/or observation point 402b, synthetic video system 104 may layer synthetic person 404 to obscure different books on bookshelf 418 at a given point along path 408.

In some embodiments, as person 404 travels path 408, synthetic video system may determine properties of light source 420 (e.g., location, brightness, and/or wavelength(s)), or the properties of light source 420 may be known. In some embodiments, the properties of light source 420 may change or may be fixed. In some embodiments, synthetic video system 104 may determine illumination properties of objects in video scene 400 (e.g., reflectivity, absorbance, color, or other illumination property).

In some embodiments, from the perspective of observation point 402a and/or observation point 402b, synthetic video system 104 may determine the luminance values of pixels of synthetic person 406 and/or synthetic shadow 406 at different points along path 408, consistent with disclosed embodiments. In some embodiments, synthetic video system 104 may determine luminance of values of one or more objects in video scene 400 (wall 410, chair 412, table 414, couch 416, and/or bookshelf 418). Synthetic video system 104 may determine luminance values of real or synthetic objects (e.g., person 404) using known lighting algorithms (e.g., illumination models, ray tracing, radiosity, or other lighting algorithms), based on properties of light source 420 and/or properties of objects in video scene 400.

Figure 5:
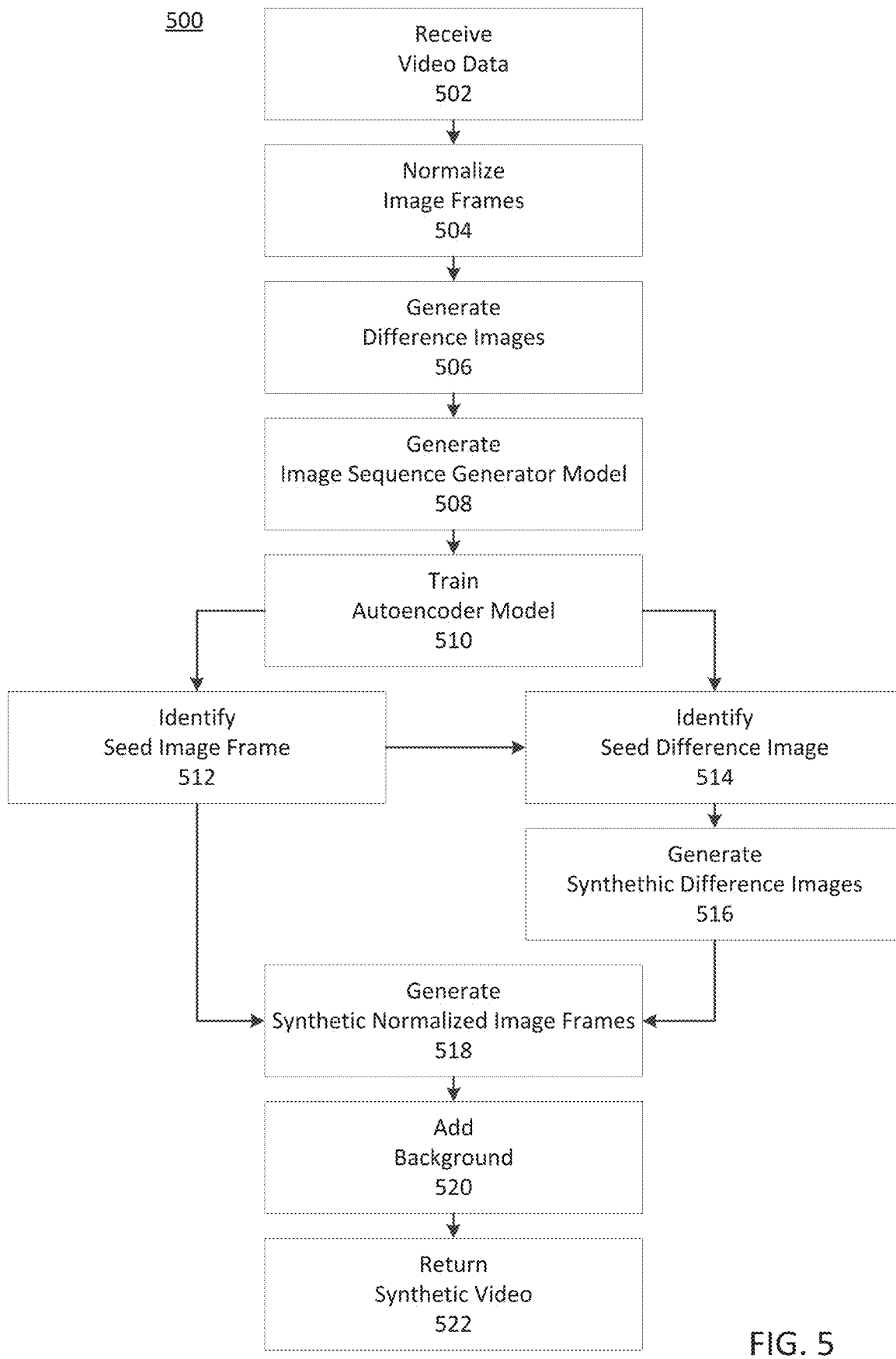
FIG. 5 depicts an exemplary process for generating synthetic video, consistent with disclosed embodiments.

FIG. 5 depicts an exemplary process 500 for generating synthetic video, consistent with disclosed embodiments. Model optimizer 108 may perform steps of process 500, consistent with disclosed embodiments. In some embodiments, model optimizer 108 is a component of synthetic video system 104 and synthetic video system 104 performs steps of process 500 with model optimizer 108, other components of synthetic video system 104, and/or other components of system 100. In some embodiments, model optimizer 108 is a component of client device 102, and client device 102 performs steps of process 500 with model optimizer 108, other components of client device 102, and/or other components of system 100. In some embodiments, the system implementing process 500 is on one of a cloud service, a distributed computing cluster, a personal computer, a user device, or another computing environment.

Process 500 may be implemented for various applications, and models described below relating to process 500 may be associated with a particular application. For example, one set of models generated and trained during one implementation of process 500 may be associated with synthetic videos generated from security camera footage at a particular location, while another set of models generated and trained during another implementation of process 500 may be associated with synthetic videos from a particular user device. As one of skill in the art will appreciate, other implementations of process 500 are possible, resulting in still other associations between other models generated and other applications.

At step 502, model optimizer 108 receives video data for a sequence of images. The video data may be received from, for example, video data 232 or video data 332. The video data may include a continuous stream of images frames, a set of images frames representing images taken over one continuous time period (a clip), or discrete sets of images, each representing video taken over a different time periods (e.g., a series of clips). In some embodiments, receiving video data includes receiving video data from a database. In some embodiments, model optimizer 108 receives video data via an interface. Model optimizer 108 may receive video data may in response to an upload of video data to a cloud service, an API submission, or a transfer of video data from a memory device (e.g., memory 230, memory 330). For example, the memory device may be a storage drive, a drive associated with a user device, a drive associated with a camera, a Secure Digital (SD) card, a Universal Serial Bus (USB) storage device, or other memory device.

The video data of step 502 may include video data that originates with a camera associated with a respective perspective. For example, the video data may include video captured by one or more security cameras located at an entryway, an Automated Teller Machine (ATM), an interior position of a building, an exterior position of a building, or the like. The video data may include a sequence of images. An image may include background objects (e.g., portions representing non-moving objects, such as a door frame, floor, or wall, or portions of the frame that are generally not detected as an object by the system) and non-background objects (e.g., portions representing moving object, such as a person, or portions of the frame detected as an object by the system (e.g., via object matching algorithms)). In some embodiments, the video data may comprise video captured by a camera of client device 102 or any other a user device including, for example, of a smart phone, a computer, a digital camera, a video camcorder, a GOPRO, or other user device. In some embodiments, the video may comprise video captured by professional video equipment.

Receiving video data at step 502 may include receiving properties of the video data, properties of an observation point associated with the video data, and/or properties of a light source associated with the video data. For example, receiving video data may include receiving one or more observation point perspectives (positions, zooms, viewing angles). The observation point may be associated with a camera. Receiving video data may include receiving the location of a light source, a light source brightness, a light source wavelength(s), and/or other properties of a light source. Receiving video data may include receiving camera information (e.g., pixel properties, light filter information, aperture information, shutter speed information, or the like). Receiving video data at step 502 may include receiving spatial data, as described above (e.g., edge data, object data).

At step 504, model optimizer 108 may normalize the received images, consistent with disclosed embodiments. Normalizing images (i.e., image normalization) may include aligning similar objects in the video data to correct for camera jitter, variation in camera position or angle, or other disturbances to the video data. Normalizing images may include, for individual images, rotating, cropping, zooming, or otherwise adjusting the image to match features of a reference image. Normalizing images may be performed using one or more image registration algorithms. Normalizing images may include adjusting one or more image parameters of the images. The image parameters may include at least one of image color, tint, contrast, or the like. For example, normalizing images may include transforming an image from a color image into a black and white image. Normalizing images may include other image processing techniques (e.g., changing sharpness, contrast, shadows, highlights of all or part of an image).

In some embodiments, normalizing images may include background subtraction and/or edge detection, consistent with disclosed embodiments. Background subtraction may include using an object recognition method to extract people or other objects from an image. For example, consistent with disclosed methods, background subtraction may include using a trained object recognition model such as a deep learning or machine learning model (e.g., a CNN model) to identify edges and the boundary of a person or other object in an image. Background subtraction may be based on the identified boundary (edge). The boundary may be identified using an image gradient method (e.g., a min to max pixel, a left to right pixel method). In some embodiments, the object recognition model may be trained according to disclosed methods and/or retrieved from model storage 106 to perform step 504.

As one of skill in the art will appreciate, the examples of normalizing images are not exhaustive, and normalizing images may include still other image processing techniques, consistent with disclosed embodiments.

At step 506, model optimizer 108 may perform image subtraction on the normalized images to generate difference images, consistent with disclosed embodiments. Image subtraction may be based on pixel subtraction. In general, an image may be expressed as a grid of pixels, each pixel having a set of values corresponding to image parameters.

The image parameters may include, for example, color data (e.g., Red-Green-Blue (RGB) values, Cyan-Magenta-Yellow-Black (CMYK) values, etc.), hue-saturation data, and the like. Image subtraction may comprise, for each image 2 to n in a sequence of n images of the video data, subtracting pixel data values of image i from corresponding pixel data values of image i+1 (i.e., each image subtracts the previous image in the sequence). In this way, a sequence of subtracted images (i.e., difference images) may be generated at step 506. The value of the pixel data of the difference images for two images may correspond to a variation between those two frames. In this way, the value of the pixels in the difference image may indicate motion between those two images.

At step 508, model optimizer 108 may generate an image sequence generator model. The image sequence generator model may be a neural network model trained on the difference images to generate sequences of synthetic difference images (or trained on the normalized images to generate sequences of synthetic normalized images), consistent with disclosed embodiments. In some embodiments, the image sequence generator model may include one or more of an RNN, a GAN, an RNN-GAN, a CNN, or an LSTM. The image sequence generator model may be trained to receive a difference image (or a normalized image) as an input and generate the next difference image (or normalized image) in a sequence of images as output. The image sequence generator model may iteratively accept its output images as inputs to generate a sequence of images starting from an initial seed image. The image sequence generator model may be trained on one or more difference image sequences (or normalized image sequences), i.e., trained on one or more clips. In some embodiments, the image sequence generator model may be stored in memory (e.g., model storage 106) at step 508.

At step 510, model optimizer 108 may train an autoencoder model to generate difference images from normalized images and to generate normalized images from difference images. For example, model optimizer 108 may train the autoencoder model, consistent with disclosed embodiments. The autoencoder model may include two separate models, an encoder model and a decoder model. The encoder model and decoder model may be neural network models and may be trained simultaneously, consistent with disclosed embodiments. Training of the autoencoder model at step 510 may be unsupervised and may apply backpropagation such that training targets may be set to be equal to training inputs. Step 510 may include storing the trained autoencoder model in memory (e.g., model storage 106).

Model optimizer 108 may train the encoder model to simplify a normalized image into a difference image, and model optimizer 108 may train the decoder model to reconstruct a normalized image from the difference image (i.e., to texturize images). For example, a sequence of normalized images may include images $n_1, n_2, n_3 \ldots n_{(n-1)}, n_n$, and differences images may include $d_{12}, d_{23} \ldots d_{(n-1)n}$. Here, $d_{12}$ is the difference image based on $n_1$ and $n_2$; $d_{23}$ is the difference image based on $n_2$ and $n_3$; and $d_{(n-1)n}$ is the difference image based on $n_{(n-1)}$ and $n_n$. In this example, model optimizer 108 may train the encoder model to generate $d_{12}$ from $n_1$ (i.e., forward-step encoding), and model optimizer 108 may train the decoder model to generate $n_1$ from $d_{12}$ (i.e., backward-step decoding). Alternatively, model optimizer 108 may train the encoder model to generate $d_{12}$ from $n_2$ (i.e., backward-step encoding), and model optimizer 108 may train the decoder model to generate $n_2$ from $d_{12}$ (i.e., forward-step decoding). As one of skill in the art will appreciate, embodiments may include other configurations of encoder and decoder models to generate difference images from normalized images and to generate normalized images from difference images.

At step 512, model optimizer 108 may identify a seed image. The seed image may be an image suitable to serve as a starting point in a synthetic video (e.g., the image may contain a person's foot stepping into the image). In some embodiments, the seed image may be a real normalized image (e.g., the seed image is a normalized image of step 504). In some embodiments, the seed image may be a synthetic normalized image and identifying the seed image may include generating the seed image using a neural network model. In some embodiments, a GAN model may be used to generate the seed image. The neural network model of step 512 may be retrieved from memory (e.g., from model storage 106). As shown in FIG. 5, in some embodiments, model optimizer 108 may not perform step 512.

At step 514, model optimizer 108 may identify a seed difference image. As shown in FIG. 5, in some embodiments, step 514 may follow step 512, and identifying the seed difference image may include generating the seed difference image based on the seed image, using the encoder model trained at step 510. In some embodiments, step 514 may include retrieving the encoder model from memory (e.g., model storage 106). As shown in FIG. 5, in some embodiments, step 514 may be omitted.

As shown in FIG. 5, in some embodiments, model optimizer 108 may perform step 514 when step 512 is skipped. In these embodiments, the seed difference image may be a real difference image (e.g., a difference image of step 506). Alternatively, in these embodiments, the seed difference image may be a synthetic difference image and identifying the seed difference image includes generating the seed difference image using a neural network model. For example, the neural network model may be trained using the difference image to generate a synthetic difference image. In some embodiments, a GAN model may be used to generate the seed difference image. Step 514 may include retrieved the neural network model from memory (e.g., from model storage 106).

At step 516, the image sequence generator model trained on the difference images may generate a sequence of synthetic difference images based on the seed difference image. Step 516 may be performed by model optimizer 108, consistent with disclosed embodiments. In some embodiments, step 516 may include retrieving the image sequence generator model from memory (e.g., model storage 106). As shown in FIG. 5, in some embodiments, step 516 may be omitted.

At step 518, model optimizer 108 may generate a sequence of synthetic normalized images. As shown in FIG. 5, step 518 may follow one of steps 512, 514, or 516. In some embodiments, model optimizer 108 may generate the sequence of synthetic normalized images at step 518 following step 516 by applying the decoder model to the sequence of synthetic difference images. In some embodiments, step 518 may include retrieving the decoder model from memory (e.g., model storage 106).

In some embodiments, model optimizer 108 may generate the sequence of synthetic normalized images at step 518 following step 512 by using the image sequence generator model trained on the normalized images to generate the sequence of synthetic normalized images based on the seed normalize image. In some embodiments, step 518 may include retrieving the image sequence generator model from memory (e.g., model storage 106).

In some embodiments, model optimizer 108 may generate the sequence of synthetic normalized images at step 518 following step 512 by using the autoencoder model. For example, the encoder model may perform a forward-step encoding on the seed image to generate a first synthetic difference image. Next, the decoder model may perform a forward-step decoding on the first synthetic difference image to generate a first synthetic normalized image. This process may be repeated to generate a second synthetic normalized image. That is, the encoder model may perform a forward-step encoding on the first synthetic normalized image to generate a second synthetic difference image, then the decoder model may perform a forward-step decoding on the second synthetic difference image to generate a third synthetic normalized image. This process may be repeated a plurality of times to generate the sequence of synthetic normalized images. In some embodiments, step 518 may include retrieving the autoencoder model from memory (e.g., model storage 106). Consistent with disclosed embodiments, the autoencoder model may generate a sequence of synthetic normalized images starting from the seed difference image (i.e., following step 514).

At step 520, model optimizer 108 may add background to the sequence of synthetic normalized images to generate synthetic video. For example, the sequence of synthetic normalized images may be laid over (combined with) one or more photos. In some embodiments, the sequence of synthetic normalized images may be combined with one or more background images generated by a neural network model (e.g., GAN or CNN). Combing the sequence of synthetic normalized images with the generated may include using a machine learning model (e.g., an autoencoder or a GAN) to adjust at least one of color channels of image pixels, adjust luminance channels of image pixels, detect edges, or detect image features. In some embodiments, model optimizer 108 may skip step 520 (i.e., model optimizer may not add background), and the synthetic video may correspond to the sequence of synthetic normalized images.

At step 522, model optimizer 108 may returns the synthetic video. In some embodiments, returning the synthetic video may include transmitting, from model optimizer 108, the synthetic video to an outside system via the interface. In some embodiments, returning the synthetic video may include storing the synthetic video in memory (e.g., video data 232 or video data 332). For example, the step 516 may include storing the synthetic video in a database or a bucket.

Figure 6:
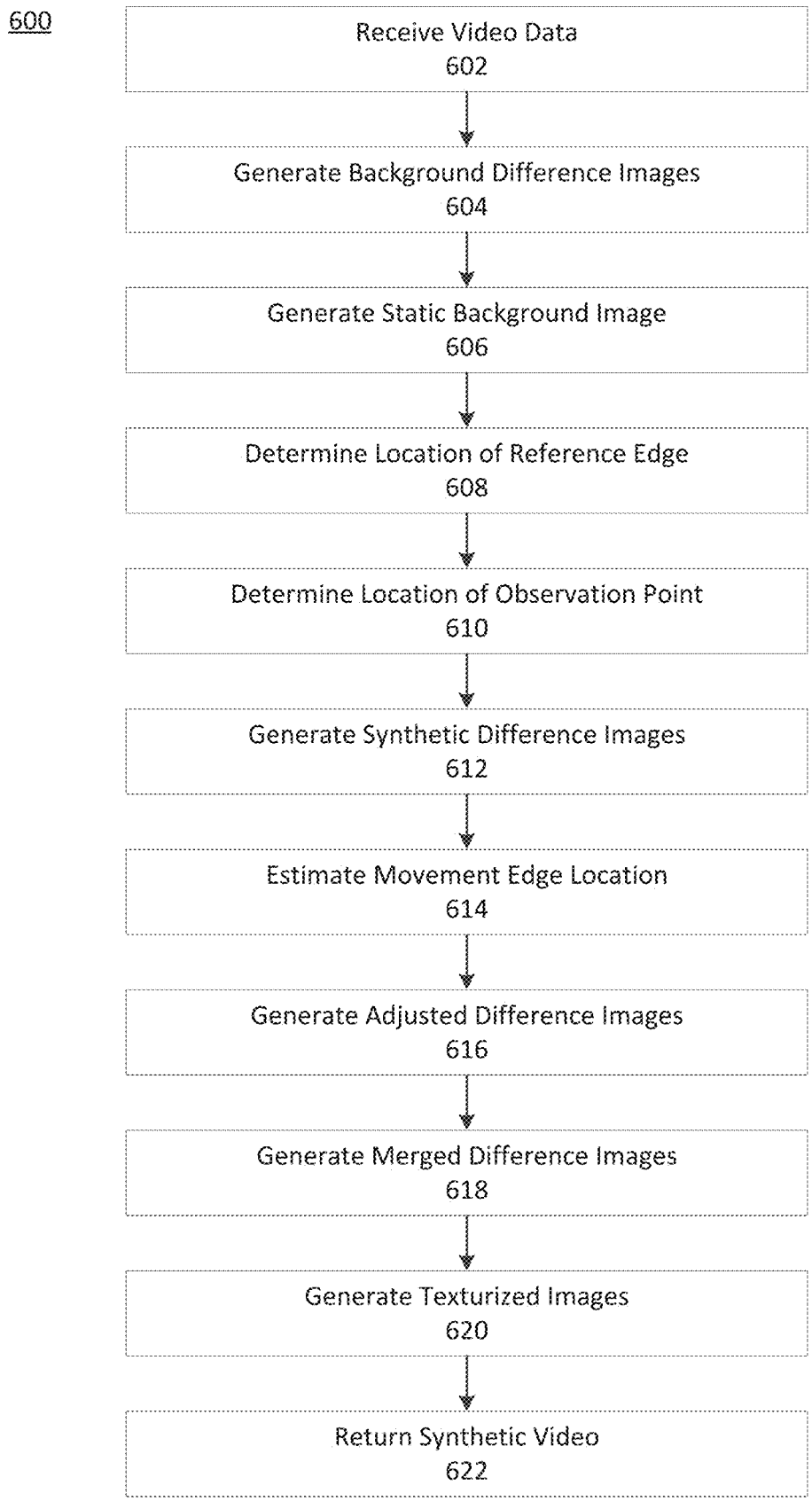
FIG. 6 depicts an exemplary process for generating synthetic video, consistent with disclosed embodiments.

FIG. 6 depicts exemplary process 600 for generating synthetic video, consistent with disclosed embodiments. Synthetic video system 104, client device 102, and/or other components of system 100 may perform steps of process 600, consistent with disclosed embodiments. In some embodiments, the system implementing process 600 is on one of a cloud service, a distributed computing cluster, a personal computer, a user device, or another computing environment.

At step 602, synthetic video system 104 receives video data, consistent with disclosed embodiments. The video data may include a sequence of images. The video data may be received from, for example, video data 232, and/or retrieved from video data 332. The video data may include a clip or a series of clips, as described above. In some embodiments, receiving video data includes receiving video data from a database. In some embodiments, synthetic video system 104 receives video data via an interface. Synthetic video system 104 may receive video data may in response to an upload of video data to a cloud service, an API submission, or a transfer of video data from a memory device. For example, the memory device may be a storage drive, a drive associated with a user device, a drive associated with a camera, a Secure Digital (SD) card, a Universal Serial Bus (USB) storage device, or other memory device.

The video data of step 602 may include video data that originates with a camera associated with a respective perspective. For example, the video data may include video captured by one or more security cameras located at an entryway, an Automated Teller Machine (ATM), an interior position of a building, an exterior position of a building, or the like. The video data may include a sequence of images. An image may include background (e.g., portions representing non-moving objects, such as a door frame, floor, or wall, or portions of the frame that are generally not detected as an object by the system) and non-background objects (e.g., portions representing moving object, such as a person, or portions of the frame detected as an object by the system (e.g., via object matching algorithms)). In some embodiments, the video data comprises video captured by a camera of client device 102 or any other a user device including, for example, of a smart phone, a computer, a digital camera, a video camcorder, a GOPRO, or other user device. In some embodiments, the video may comprise video captured by professional video equipment.

Receiving video data at step 602 may include receiving properties of the video data, properties of an observation point associated with the video data, and/or properties of a light source associated with the video data. For example, receiving video data may include receiving one or more observation point perspective (positions, zooms, viewing angles). The observation point may be associated with a camera. Receiving video data may include receiving the location of a light source, a light source brightness, a light source wavelength(s), and/or other properties of a light source. Receiving video data may include receiving camera information (e.g., pixel properties, light filter information, aperture information, shutter speed information, or the like). Receiving video data at step 602 may include receiving spatial data, as described above (e.g., edge data, object data).

At step 604, synthetic video system 104 generates background difference images from the received video data, consistent with disclosed embodiments. As previously described, synthetic video system 104 generates a difference image subtracting a preceding image in a video from a subsequent image. Step 604 may include normalizing images prior to generating difference images or performing other image processing methods, consistent with disclosed embodiments. For example, if the video data includes a clip of people walking on the sidewalk, the background difference images may depict the people's motion. Generating background difference images may include converting image data into a format having luminance data (e.g., a luminance channel).

At step 606, synthetic video system 104 generates a static background image, consistent with disclosed embodiments. The static background image may include pixels from images in the received video not associated with motion in the background difference images. For example, if the video data includes a clip of people walking on the sidewalk, the static background images may depict the sidewalk and surroundings (parked cars, trees, buildings, etc.). Step 606 may include normalizing images prior to generating the static background image or performing other image processing methods, consistent with disclosed embodiments. Generating a static background image may include converting image data into a format having luminance data (e.g., a luminance channel). Step 606 may include estimating a location and brightness of a light source based on luminance values of the static background image.

At step 608, synthetic video system 104 detects and determine the location of one or more edges of the static background image. Step 608 may include determining the location of one or more reference edges having a known or estimated size, and/or be associated with a known object. In some embodiments, locations of the one or more detected edges are known and/or received (e.g., received at step 602 and/or retrieved from spatial data 333). Step 608 may include determining a plurality of edge distances between the detected one or more edges. Step 608 may include generating a three-dimensional model of the static background image. Step 608 may include identifying one or more objects based on one or more identified edges.

In some embodiments, synthetic video system 104 may determine the location of an edge using a combination of edge detection methods, object detection methods, and homography methods (e.g., as performed by edge detection module 336, object detection module 337, and/or homography module 338). For example, synthetic video system 104 may determine a plurality of edges using edge detection module 336, detect one or more objects based on the detected edges using object detection module 337, and determine positions of one or more edges (including a reference edge) using homography module 338. The reference edge may be associated with a detected object of a known or estimated size, consistent with disclosed embodiments.

At step 610, synthetic video system 104 determines a perspective (position, zoom, viewing angle) of one or more observation points, consistent with disclosed embodiments. In some embodiments, the perspective of the observation point is known and/or received (e.g., received at step 602 and/or retrieved from spatial data 333). In some embodiments, synthetic video system 104 may determine the perspective of an observation using a combination of edge detection methods, object detection methods, and homography methods (e.g., as performed by edge detection module 336, object detection module 337, and/or homography module 338). The perspective of the observation point may include a position, a zoom, and a viewing angle.

At step 612, synthetic video system 104 generates synthetic difference images, consistent with disclosed embodiments. Synthetic video system may generate synthetic difference images by implementing a machine learning model. For example, synthetic video system 104 may generate synthetic difference images by implementing steps of process 500 to train a model to predict a synthetic difference image based on a previous synthetic difference image. In some embodiments, synthetic video system 104 generates synthetic difference images based on a video clip received from a component of system 100 and/or retrieved from storage (e.g., video data 332). As an example, at step 612, synthetic video system 104 may generate difference images based on a video of a synthetic person walking down a sidewalk or across a room (e.g., as in video setting 400 or process 700). As another example, at step 612, synthetic video system 104 may generate difference images based on a video of a cartoon person or cartoon object. Step 612 may include combining synthetic difference images with the static background image.

At step 614, synthetic video system 104 determines a location of one or more movement edges of one or more synthetic objects (i.e., one or more synthetic object movement edges), consistent with disclosed embodiments. A movement edge is an edge associated with the synthetic difference images and may be an edge associated with a synthetic object (e.g., an edge associated with a person's leg while walking). In some embodiments, the location of the movement edge is known and/or received (e.g., retrieved from spatial data 333). In some embodiments, synthetic video system 104 may determine the location of a movement edge using a combination of edge detection methods, object detection methods, and homography methods (e.g., as performed by edge detection module 336, object detection module 337, and/or homography module 338). For example, step 614 may include detecting and identifying moving synthetic objects in the difference images. Step 614 may include combining synthetic difference images with the static background image.

At step 616, synthetic video system 104 generates adjusted difference images based on the synthetic difference images, consistent with disclosed embodiments. Step 616 may include combining synthetic difference images with the static background image. Step 616 includes using methods of homography, consistent with disclosed embodiments. At step 616, movement edges may be scaled. For example, if it is determined that the size of a synthetic object associated with a movement edge is too large or too small (i.e., a giant is walking down the sidewalk when a normal-sized person is desired), the movement edge may be scaled. At step 616, a movement edge and background edges (including a reference edge) may be layered. For example, as depicted in video setting 400, at step 616, a movement edge associated with the leg of synthetic person 404 may be layered behind table 414 relative to observation point 402*b*.

In some embodiments, step 616 includes adjusting luminance values associated with synthetic difference images and/or static background image. Step 616 may include determining luminance values of the static background image; and/or estimating a location and brightness of a light source based on the luminance values of the static background image. Synthetic video system 104 may adjust luminance values based on the location and brightness of the light source. Step 616 may include training and implementing a machine learning model to generate adjusted difference images. In some embodiments, step 616 includes implementing a previously-trained machine learning model to generate adjusted difference images.

At step 618, synthetic video system 104 generates merged difference images, consistent with disclosed embodiments. In some embodiments, step 618 includes merges adjusted difference images and background difference images to generate merged difference images. At step 618 synthetic video system 104 may use a combination of edge detection methods, object detection methods, homography methods, and pose estimation methods to scale or overlap adjusted difference images and background difference images (e.g., as performed by edge detection module 336, object detection module 337, and/or homography module 338). In some embodiments, to generate merged difference images, synthetic video system 104 implements one or more gradient domain methods, image stitching methods, and/or other image merging methods (e.g., as performed by image merging module 339).

At step 620, synthetic video system 104 generates texturized images, consistent with disclosed embodiments. Generating a texturized image may be based on at least one of a synthetic difference image, an adjusted difference image, or a merged difference image. For example, in some embodiments, texturized images are generated from adjusted difference images but not on the merged difference image (e.g., the background is static and step 618 is skipped). Programs 335 may perform step 620. Texturizing images at step 620 may include transforming difference images into texturized images using a machine learning model. The machine learning model may include at least one of an autoencoder, a decoder model, an RNN, a CNN, or other machine learning model. Step 620 may include training a model and/or retrieving a model from storage (e.g., model storage 106).

At step 622, synthetic video system 104 returns a synthetic video. In some embodiments, returning the synthetic video includes transmitting, from synthetic video system 104, the synthetic video to an outside system via the interface. In some embodiments, returning the synthetic video may include storing the synthetic video in memory (e.g., video data 232 or video data 332). For example, the step 516 may include storing the synthetic video in a database or a bucket.

Figure 7A:
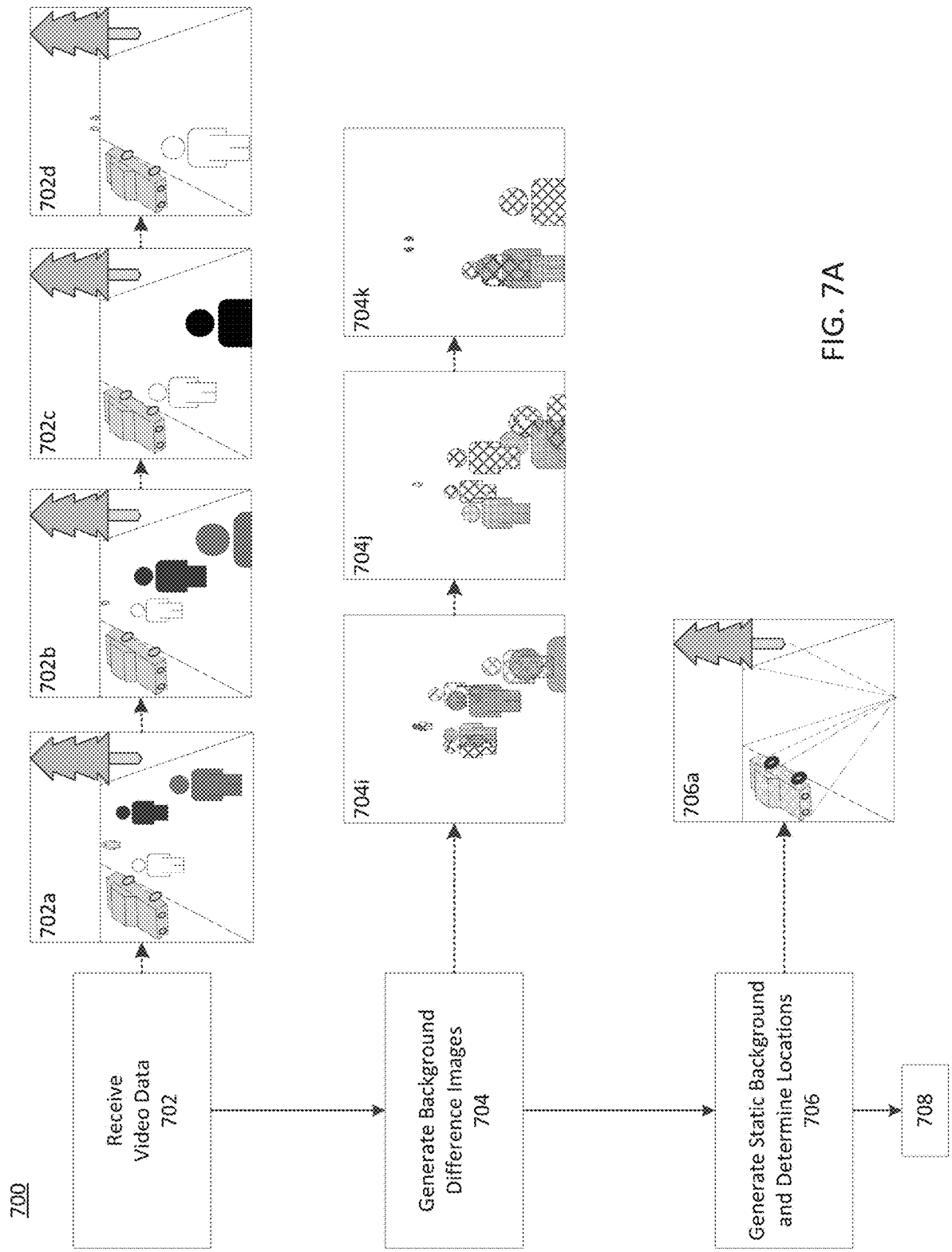
FIG. 7A is an illustration of an exemplary process for generating synthetic video with illustrations of exemplary images, consistent with disclosed embodiments.
Figure 7B:
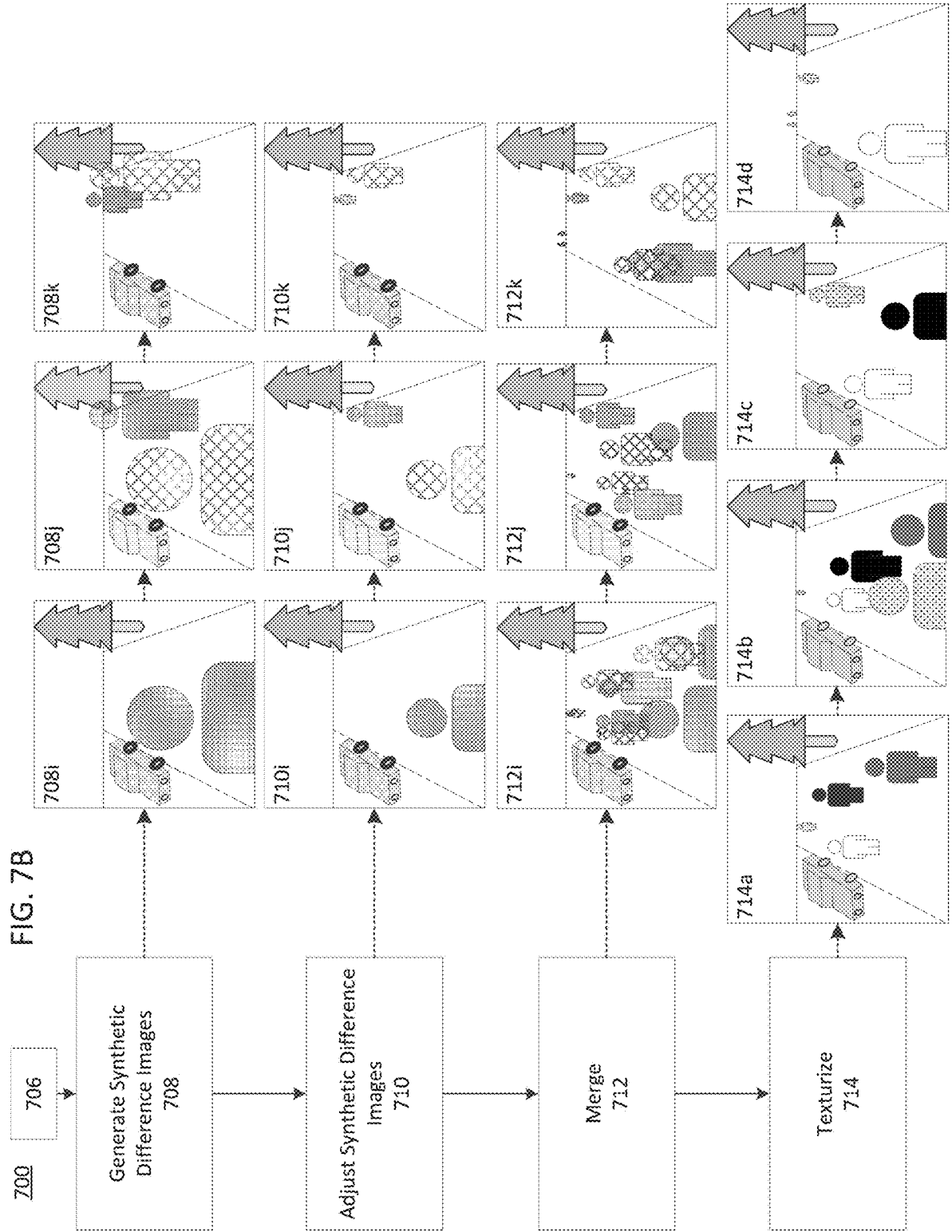
FIG. 7B is an illustration of an exemplary process for generating synthetic video with illustrations of exemplary images, consistent with disclosed embodiments.

FIG. 7A and FIG. 7B illustrate exemplary process 700 for generating synthetic video with illustrations of exemplary images, consistent with disclosed embodiments. FIG. 7A and FIG. 7B are provided for purposes of illustration only and are not intended to limit the disclosed embodiments. Process 700 is an exemplary implementation of process 600, consistent with disclosed embodiments. Synthetic video system 104, client device 102, and/or other components of system 100 may perform steps of process 700, consistent with disclosed embodiments. In some embodiments, the system implementing process 700 is on one of a cloud service, a distributed computing cluster, a personal computer, a user device, or another computing environment. The order and arrangement of steps in process 700 is provided for purposes of illustration. As will be appreciated from this disclosure, modifications may be made to process 700 by, for example, adding, combining, removing, and/or rearranging the steps for process 700.

At step 702, synthetic video system 102 may receive video data that includes a sequence of images 702a, 702b, 702c, and 702d, consistent with disclosed embodiments. Step 702 may correspond to step 602 of process 600.

The sequence of images received at step 702 may be captured from an observation point with a fixed perspective (location, zoom, viewing angle). As shown, the sequence may include people walking on a sidewalk represented by silhouettes. The frame may include the land surface (sidewalk with surrounding street and grass), a tree, and a car. In the example image frames, the sidewalk runs away from the observation point up a hill, with a hill crest represented by the horizontal line above car and behind the tree.

In the sequence, the larger white, gray, and black silhouettes of image 702a may move generally down the image frame with some lateral motion. The larger gray silhouette may move out of the frame at image 702c and the black silhouette may move out of the frame at image 702d. The smaller silhouette of image 702a may move away from the observation point, up the image frame, in images 702a and 702b, and out of the frame in image 702c. Two new figures may appear at the horizon in frame 702d.

At step 704, synthetic video system 104 may generate background difference images 704i, 704j, and 704k, consistent with disclosed embodiments. Generating background difference images at step 704 may include normalization, consistent with disclosed embodiments. Synthetic video system 104 may generate background difference image 704i by subtracting image 702a from image 702b. In some embodiments, step 706 may correspond to step 604 of process 600.

In image 704i, dotted silhouettes correspond to silhouettes as located in the later image, image 702b. Checked silhouettes correspond to silhouettes as located in the earlier image, image 702a (i.e., "ghosts"). Similarly, synthetic video system 104 may generate background difference image 704j by subtracting image 702b from image 702c and may generate background difference image 704k by subtracting image 702c from image 702d. Object edges (e.g., silhouette edges) in images 704i-704k may be movement edges because they arise due to motion from one image to another image.

At step 706, synthetic video system 104 may generate static background image 706a and determines reference locations, consistent with disclosed embodiments. As shown, static background image 706a may include the land surface, tree, and parked car. In some embodiments, step 706 may correspond to steps 606-610 of process 600.

Generating static background image 706a may include normalizing images and image subtraction, consistent with disclosed embodiments. Determining reference locations may include generating a plurality of object edges and determining distances using a combination of edge detection, object detection, homography, and pose estimation methods, consistent with disclosed embodiments. The dotted lines in image 706a illustrate distance between an observation point and various objects. Determining reference locations may be based on known objects, such as a car tire, size of a car, sidewalk width, tree needles length, or other object size.

At step 708, synthetic video system 104 may generate a sequence of synthetic difference images 708i, 708j, and 708k, consistent with disclosed embodiments. In some embodiments, the synthetic difference images may be generated according to process 500. In some embodiments, step 708 may correspond to step 612 of process 600.

In image 708i, a synthetic person moves into the bottom of the image frame of the static background image. In image 708j, the synthetic person moves up the sidewalk towards the tree and the 'ghost' of the synthetic person remains at the bottom of the frame. In image 708j, the synthetic person moves further up the sidewalk towards the tree and the 'ghost' remains in the middle of the frame. Object edges of the silhouettes in images 708i-708k are movement edges. As shown, the movement edges associated with the synthetic person show the person is unnaturally large as compared to background objects in images 708i-708k.

At step 710, synthetic video system 104 may generate a sequence of adjusted difference images 710i, 710j, and 710k, consistent with disclosed embodiments. Image 710i may be based on image 708i; image 710j may be based on image 708j; and image 710k may be based on image 708k. Step 710 may correspond to steps 614-616 of process 600.

Step 710 may include determining the location of one or more movement edges in images 708j-708k, scaling movement edges, and/or layering the synthetic object with background images. As shown, the movement edges associated with the synthetic person show the person are unnaturally large as compared to background objects in images 710i-710k. At step 712, synthetic video system 104 may generate merged images 712i, 712j, and 712k by merging background difference images 704i, 704j, and 704k with adjusted difference images 710i, 710j, and 710, respectively. As shown, motion edges for silhouettes in merged images 712i-712j overlap from the perspective of the observation point. Accordingly, step 712 may include methods to scale, layer, and smooth synthetic object edges, background object edges, and background movement edges, consistent with disclosed embodiments. At step 712, synthetic video system 104 may use a combination of edge detection methods, object detection methods, homography methods, and pose estimation methods to scale or overlap adjusted difference images and background difference images (e.g., as performed by edge detection module 336, object detection module 337, and/or homography module 338). In some embodiments, to generate merged difference images, synthetic video system 104 implements gradient domain methods, image stitching methods, or other image merging methods (e.g., as performed by image merging module 339). In some embodiments, step 710 corresponds to steps 618 of process 600.

At step 714, synthetic video system 104 generates texturized images 714a, 714b, 714c, and 714d. As shown in the example, the initial image in the sequence of texturized images (image 714a) is the same image as image 702a; texturized image 714b is generated based on texturized image 714a and merged difference image 712i; texturized image 714c is generated based on texturized image 714b and merged difference image 712j; and texturized image 714d is generated based on texturized image 714c and merged difference image 712k. Texturizing an image at step 714 may involve using machine learning models, consistent with disclosed embodiments. In some embodiments, step 714 corresponds to step 620 of process 600.

Systems and methods disclosed herein involve unconventional improvements over conventional synthetic video approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein. It should be noted that client device 102 may perform any of the features or steps described above in regard to synthetic video system 104 in reference to the various embodiments and processes.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

Computer programs based on the written description and methods of this specification are within the skill of a software developer. The various functions, scripts, programs, or modules may be created using a variety of programming techniques. For example, programs, scripts, functions, program sections or program modules may be designed in or by means of languages, including JAVASCRIPT, C, C++, JAVA, PHP, PYTHON, RUBY, PERL, BASH, or other programming or scripting languages. One or more of such software sections or modules may be integrated into a computer system, non-transitory computer-readable media, or existing communications software. The programs, modules, or code can also be implemented or replicated as firmware or circuit logic.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system for generating synthetic video comprising:
   one or more memory units storing instructions; and
   one or more processors configured to execute the instructions to perform operations comprising:
      generating background difference images from a sequence of images;
      determining a location of a light source associated with a background image;
      generating synthetic difference images;
      generating a sequence of adjusted difference images based on the synthetic difference images and the location of the light source;
      generating merged difference images based on the adjusted difference images and the background difference images; and
      generating texturized images based on the merged difference images.

2. The system of claim 1, wherein generating background difference images is based on a method of image subtraction.

3. The system of claim 1, wherein:
   the operations further comprise determining, for individual background difference images, a location of a respective background movement object edge; and
   the generating of the merged difference images is based on the locations of the background movement edges.

4. The system of claim 3, wherein:
   the operations further comprise generating a sequence of normalized images based on the sequence of images; and
   the generating of the background difference images comprises applying a method of image subtraction to the normalized sequence of images.

5. The system of claim 1, wherein the operations further comprise:
   generating a static background image based on the sequence of images; and
   determining a location of a reference edge in the static background image,
   wherein the generating of the adjusted difference images is based on the location of the reference edge.

6. The system of claim 1, the operations further comprising:
   generating a static background image based on the sequence of images; and
   determining a location of a reference edge in the static background image, wherein the generating of the merged difference images is based on the location of the reference edge.

7. The system of claim 6, wherein determining the location of the reference edges comprises using at least one of an edge detecting method, an object detection method, a homography method, or a pose estimation method.

8. The system of claim 1, wherein generating the synthetic difference images includes using an image sequence generator model.

9. The system of claim 8, the operations further comprising training the image sequence generator model to generate synthetic difference images based on training difference images.

10. The system of claim 8, the image sequence generator model comprises at least one of a recurrent neural network (RNN) model, a generative adversarial model (GAN), an RNN GAN model, a convolutional neural network model, or a long short term memory (LSTM) model.

11. The system of claim 8, wherein the generating synthetic difference images comprises iteratively using the image sequence generator model to accept a previous synthetic difference image as an input and return a subsequent synthetic difference image as an output, starting from a first difference image.

12. The system of claim 1, wherein:
the operations further comprise at least one of receiving or determining a perspective of an observation point; and
generating at least one of the adjusted difference images is based on the perspective of the observation point.

13. The system of claim 1, wherein generating at least one of the adjusted difference images comprises estimating a location and brightness of a light source based on luminance values.

14. The system of claim 1, wherein generating at least one of the adjusted difference images comprises using at least one of a gradient domain method or an image stitching method.

15. The system of claim 1, wherein generating at least one of the merged difference images comprises using at least one of an edge detecting method, an object detection method, a homography method, or a pose estimation method.

16. The system of claim 1, wherein generating at least one of the merged difference images comprises using at least one of a gradient domain method or an image stitching method.

17. The system of claim 1, wherein generating at least one of the texturized images comprises implementing a decoder model to perform at least one of a forward-step decoding or backward-step decoding.

18. The system of claim 1, wherein generating at least one of the texturized images is based on at least one of edge density or edge direction.

19. A method for generating synthetic video comprising:
generating background difference images from a sequence of images;
determining a location of a light source associated with a background image;
generating synthetic difference images;
generating a sequence of adjusted difference images based on the synthetic difference images and the location of the light source;
generating merged difference images based on the adjusted difference images and the background difference images; and
generating texturized images based on the merged difference images.

20. A system for generating synthetic video comprising:
one or more memory units storing instructions; and
one or more processors configured to execute the instructions to perform operations comprising:
generating background difference images from a sequence of images;
determining one or more properties of a light source associated with a background image;
generating synthetic difference images;
generating a sequence of adjusted difference images based on the synthetic difference images and a location of the light source;
generating merged difference images based on the adjusted difference images and the background difference images; and
generating texturized images based on the merged difference images.

\* \* \* \* \*